(12) United States Patent
Onishi

(10) Patent No.: US 11,196,303 B2
(45) Date of Patent: *Dec. 7, 2021

(54) CONTROL DEVICE, POWER RECEIVING DEVICE, ELECTRONIC APPARATUS, AND CONTACTLESS POWER TRANSMISSION SYSTEM

(71) Applicant: SEIKO EPSON CORPORATION, Tokyo (JP)

(72) Inventor: Kota Onishi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 16/272,357

(22) Filed: Feb. 11, 2019

(65) Prior Publication Data

US 2019/0207435 A1 Jul. 4, 2019

Related U.S. Application Data

(63) Continuation of application No. 15/352,156, filed on Nov. 15, 2016, now Pat. No. 10,256,668.

(30) Foreign Application Priority Data

Nov. 25, 2015 (JP) .................. 2015-229369

(51) Int. Cl.
*H02J 50/80* (2016.01)
*H02J 50/90* (2016.01)
(Continued)

(52) U.S. Cl.
CPC ............ *H02J 50/80* (2016.02); *H02J 7/0063* (2013.01); *H02J 7/025* (2013.01); *H02J 50/12* (2016.02); *H02J 50/90* (2016.02); *H02J 7/0042* (2013.01)

(58) Field of Classification Search
CPC .. H02J 50/80; H02J 50/90; H02J 50/12; H02J 7/0063; H02J 7/0025; H02J 7/0042
(Continued)

(56) References Cited

U.S. PATENT DOCUMENTS 8,179,089 B2   5/2012   Shiozaki et al.
8,314,513 B2  11/2012   Aoyama et al.
(Continued)

FOREIGN PATENT DOCUMENTS

EP   2894755 A1 *  7/2015  ............. H02J 50/10
EP   2894755 A1    7/2015
(Continued)

OTHER PUBLICATIONS

Nov. 20, 2018 Notice of Allowance and Fee(s) Due issued in U.S. Appl. No. 15/352,156.
(Continued)

*Primary Examiner* — Hal Kaplan
*Assistant Examiner* — Swarna N Chowdhuri
(74) *Attorney, Agent, or Firm* — Oliff PLC

(57) ABSTRACT

A control device to be used in a power receiving device that receives power from a power transmitting device by contactless power transmission includes a power supply portion that supplies power to a load based on power received by a power receiving portion, a communication portion that performs communication in which communication data is transmitted to the power transmitting device, and a control portion that controls the power supply portion and the communication portion. The control portion causes the communication portion to start the communication when an output voltage of the power receiving portion becomes higher than a first voltage, and causes the power supply portion to start power supply to the load when, after the communication is started, the output voltage of the power
(Continued)

receiving portion becomes higher than a second voltage that is different from the first voltage.

16 Claims, 19 Drawing Sheets

(51) Int. Cl.
*H02J 50/12* (2016.01)
*H02J 7/02* (2016.01)
*H02J 7/00* (2006.01)

(58) Field of Classification Search
USPC .......................................................... 307/104
See application file for complete search history.

(56) References Cited

U.S. PATENT DOCUMENTS

| | | | |
|---|---|---|---|
| 9,306,634 B2* | 4/2016 | Low | H04B 5/0037 |
| 2009/0174264 A1 | 7/2009 | Onishi et al. | |
| 2009/0174364 A1 | 7/2009 | Onishi et al. | |
| 2009/0175060 A1 | 7/2009 | Onishi et al. | |
| 2010/0013321 A1 | 1/2010 | Onishi et al. | |
| 2010/0320962 A1 | 12/2010 | Sekita et al. | |
| 2011/0169446 A1 | 7/2011 | Kondo | |
| 2012/0104867 A1 | 5/2012 | Mudrick et al. | |
| 2013/0026849 A1 | 1/2013 | Ohta et al. | |
| 2013/0039395 A1 | 2/2013 | Norconk et al. | |
| 2013/0043837 A1 | 2/2013 | Sekita et al. | |
| 2013/0130621 A1 | 5/2013 | Kim et al. | |
| 2014/0097671 A1 | 4/2014 | Nakamura et al. | |
| 2014/0247008 A1 | 9/2014 | Sekita et al. | |
| 2014/0252866 A1* | 9/2014 | Walsh | H01F 38/14 307/104 |
| 2014/0254696 A1 | 9/2014 | Norconk et al. | |
| 2014/0285030 A1 | 9/2014 | Nakamura et al. | |
| 2015/0102687 A1 | 4/2015 | Miyamoto et al. | |
| 2015/0222330 A1* | 8/2015 | Rapakko | H04B 5/0037 307/104 |
| 2015/0229136 A1 | 8/2015 | Fukaya | |
| 2015/0318708 A1* | 11/2015 | Bartlett | H02J 50/60 307/104 |
| 2016/0294445 A1 | 10/2016 | Norconk et al. | |
| 2017/0090537 A1* | 3/2017 | Elad | H02J 7/00034 |

FOREIGN PATENT DOCUMENTS

| | | |
|---|---|---|
| JP | 3800091 B2 | 7/2006 |
| JP | 2009-189230 A | 8/2009 |
| JP | 2009-189231 A | 8/2009 |
| JP | 2009-303294 A | 12/2009 |
| JP | 2010-213414 A | 9/2010 |
| JP | 2011-010384 A | 1/2011 |
| JP | 2011-030404 A | 2/2011 |
| JP | 2011-211780 A | 10/2011 |
| JP | 2014-050270 A | 3/2014 |
| JP | 2014-509486 A | 4/2014 |
| WO | 2001/059951 A1 | 8/2001 |
| WO | 2010/035545 A1 | 4/2010 |
| WO | 2012/176264 A1 | 12/2012 |
| WO | 2013/061440 A1 | 5/2013 |

OTHER PUBLICATIONS

Jan. 9, 2019 Corrected Notice of Allowability issued in U.S. Appl. No. 15/352,156.

* cited by examiner

| DVST[1:0] | 0 | 1 | 2 | 3 |
|---|---|---|---|---|
| VST(V) | 4.5 | 5.0 | 5.5 | 6.0 |

FIG. 17
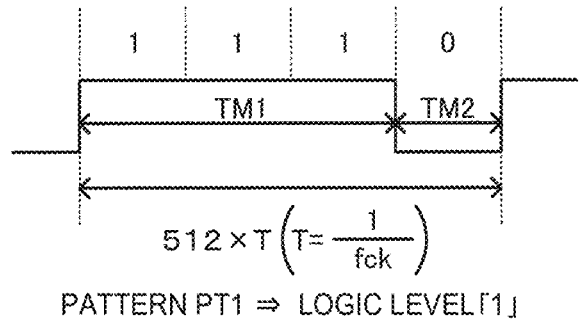
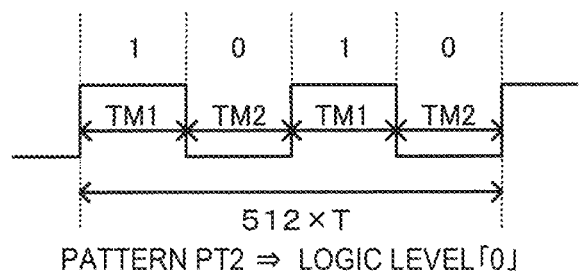
FIG. 18
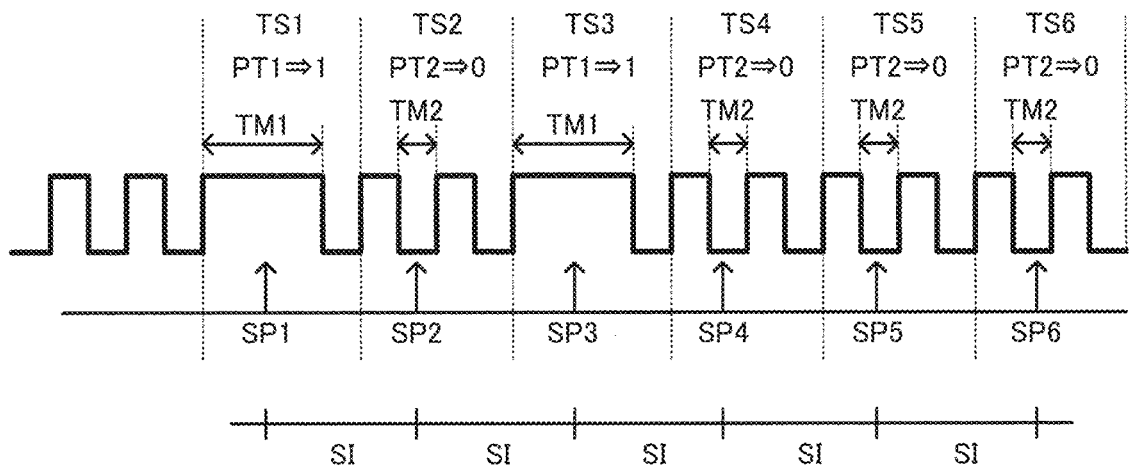

FIG. 19A

| 16bit | 16bit | 16bit | 16bit |
|---|---|---|---|
| 0000h | (1) DATA CODE + RECTIFICATION VOLTAGE | (2)(3)(4)(5)(6)(7)(8) | (9)CRC |

FIG. 19B

| | bit15 | bit0 |
|---|---|---|
| (1) | DATA CODE | RECTIFICATION VOLTAGE |
| (2) | TEMPERATURE ||
| (3) | BATTERY VOLTAGE ||
| (4) | BATTERY CURRENT ||
| (5) | STATUS FLAG ||
| (6) | NUMBER OF CYCLES ||
| (7) | IC NUMBER, CHARGING EXECUTION, OFF START ||
| (8) | ID ||
| (9) | CRC ||

CONTROL DEVICE, POWER RECEIVING DEVICE, ELECTRONIC APPARATUS, AND CONTACTLESS POWER TRANSMISSION SYSTEM

CROSS-REFERENCE TO RELATED APPLICATIONS

The present application is a continuation of U.S. application Ser. No. 15/352,156, filed Nov. 15, 2016, which claims priority to Japanese Patent Application JP 2015-229369, filed Nov. 25, 2015, the entire disclosures of which are hereby incorporated by reference.

BACKGROUND

1. Technical Field

Various embodiments of the present invention relate to a control device, a power receiving device, an electronic apparatus, a contactless power transmission system, and the like.

2. Related Art

In recent years, much attention has been paid to contactless power transmission (wireless power transfer) in which electromagnetic induction is used to make power transmission possible without a metal contact. Power supply to electronic apparatuses such as a household appliance, a mobile terminal, and an electric car has been proposed as an application example of the contactless power transmission.

A known technology for the contactless power transmission is disclosed in JP-A-2010-213414, for example. In the known technology, in a waiting period in which landing of a power receiving device is waited for, a power transmitting device intermittently transmits power to the power receiving device. Also, a method is adopted in which the transmitting power to the power receiving device in the period of intermittent power transmission for landing detection is reduced compared with the power in a normal power transmission.

In the case where the distance between a power transmitting device and a power receiving device (distance between a primary coil and a secondary coil) is large in a contactless power transmission system, a drive voltage for transmitting power (primary coil drive voltage) of the power transmitting device needs to be set high in order to realize appropriate landing detection.

However, when the drive voltage is set high, in the case where the distance between the power transmitting device and the power receiving device is reduced in this state, the output voltage of a power receiving portion of the power receiving device becomes higher than an allowable voltage, and a failure may occur in a circuit of the power receiving device. Specifically, the output voltage, which is a rectified voltage, increases, and thus a breakdown voltage abnormality in which the output voltage exceeds a breakdown voltage of a transistor that constitutes the circuit, or the like occurs. Therefore, there is a problem in that a landing detection over a large distance range cannot be realized.

SUMMARY

According to some aspects of the invention, a control device, a power receiving device, an electronic apparatus, a contactless power transmission system and the like can be provided in which the occurrence of a circuit failure or the like can be suppressed while realizing landing detection over a large distance range or the like.

One aspect of the invention relates to a control device to be used in a power receiving device that receives power from a power transmitting device by contactless power transmission, the control device including: a power supply portion that supplies power to a load based on power received by a power receiving portion; a communication portion that performs communication in which communication data is transmitted to the power transmitting device; and a control portion that controls the power supply portion and the communication portion. The control portion causes the communication portion to start the communication when an output voltage of the power receiving portion becomes higher than a first voltage, and causes the power supply portion to start power supply to the load when, after the communication is started, the output voltage of the power receiving portion becomes higher than a second voltage that is different from the first voltage.

In one aspect of the invention, power from the power transmitting device is received by the power receiving portion, and power is supplied to the load based on the received power. When an output voltage of the power receiving portion becomes higher than the first voltage, the communication portion starts communication, and communication data is transmitted to the power transmitting device. Also, a second voltage that is different from the first voltage is provided. When the output voltage of the power receiving portion becomes higher than the second voltage after the communication has been started, power supply to the load by the power supply portion is started. In this way, in one aspect of the invention, the first voltage, which is a communication start voltage, and the second voltage, which is a power supply start voltage, are provided as separate voltages. The determination of a communication start and the determination of a power supply start are enabled to be separately performed using the first and second voltages. Accordingly, it is made possible that the occurrence of failure in a circuit on the power receiving side can be suppressed or the like while realizing landing detection over a large distance range or the like.

Also, in one aspect of the invention, the communication portion that has been caused to start the communication by the control portion transmits transmitting power setting information to the power transmitting device as the communication data, and the control portion may cause the power supply portion to start power supply to the load when the output voltage of the power receiving portion becomes higher than the second voltage as a result of the power transmitting device controlling power based on the transmitting power setting information.

In this way, when communication is started as a result of the output voltage of the power receiving portion becoming higher than the first voltage, the power transmitting device receives the transmitting power setting information, and can perform control of the transmitting power based on the received transmitting power setting information. Then, when the output voltage of the power receiving portion becomes higher than the second voltage as a result of control of the transmitting power, power supply to the load is started, and thus landing detection over a large distance range or the like and suppression of the occurrence of a circuit failure or the like can be realized.

Also, in one aspect of the invention, the control portion may cause the communication portion to start the communication when the output voltage of the power receiving portion becomes higher than the first voltage due to intermittent power transmission for landing detection performed by the power transmitting device.

As a result of performing intermittent power transmission for landing detection in this way, power consumption in a period of landing detection can be reduced. When the output voltage of the power receiving portion becomes higher than the first voltage due to intermittent power transmission for landing detection, communication is started, and the power transmitting device can be caused to perform various types of control so as to cause the output voltage of the power receiving portion to change, for example.

Also, in one aspect of the invention, the communication portion may transmit dummy data in order for the power transmitting device to determine whether landing has been detected to the power transmitting device when the output voltage of the power receiving portion becomes higher than the first voltage.

In this way, when the output voltage of the power receiving portion becomes higher than the first voltage, dummy data for landing detection is transmitted to the power transmitting device. The power transmitting device can detect landing of the power receiving side by detecting the dummy data.

Also, in one aspect of the invention, the control portion may allow the power supply portion to supply power to the load when the power transmitting device has succeeded in detecting landing and has made a reply to the power receiving device.

In this way, as a result of the power transmitting device that has succeeded in detecting landing making a reply to the power receiving device, the success in detecting landing can be conveyed to the power receiving side control device. The power receiving side control device can start power supply to the load on the condition that such a reply has been made by the power transmitting device.

Also, in one aspect of the invention, the communication portion is a load modulation portion that transmits the communication data by load modulation, and the load modulation portion may start the load modulation when the output voltage of the power receiving portion becomes higher than the first voltage and landing is detected, and stop the load modulation when removal is detected.

In this way, when the output voltage becomes higher than the first voltage and landing is detected, various information is transmitted to the power transmitting device by load modulation, and thus the power transmitting device can be caused to perform various types of processing and control. Also, as a result of the load modulation being stopped when removal is detected, it is made possible to cause the power transmitting device to continue normal power transmission or the like on the condition that load modulation continues.

Also, in one aspect of the invention, the communication portion is a load modulation portion that transmits the communication data by load modulation, and the load modulation portion may perform load modulation such that a load modulation pattern for a first logic level of the communication data to be transmitted to the power transmitting device is a first pattern, and perform load modulation such that a load modulation pattern for a second logic level of the communication data to be transmitted to the power transmitting device is a second pattern that is different from the first pattern.

In this way, compared with a communication method in which first and second logic levels of the communication data are respectively associated with first and second load states of the load modulation, for example, the detection sensitivity with respect to a load change by the load modulation and the noise immunity in detection can be improved.

Also, in one aspect of the invention, the load includes a battery and a power supply target of the battery, and the power supply portion may include a charging portion that charges the battery based on power received by the power receiving portion, and a discharging portion that performs an operation of discharging the battery and supplies the power from the battery to the power supply target.

In this way, the power supply target can be operated by performing a discharging operation such that power from a battery is supplied to the power supply target, along with charging the battery based on the power received from the power transmitting device being performed.

Also, in one aspect of the invention, the control portion may cause the discharging portion to stop the discharging operation when landing has been detected, and cause the discharging portion to perform the discharging operation in a removed period.

As a result of the discharging operation being stopped when landing is detected, wasteful power consumption can be suppressed, and power consumption can be reduced. Also, the power supply target can be operated by supplying power from the battery to the power supply target by causing the discharging portion to perform the discharging operation in a removed period.

Also, in one aspect of the invention, the first voltage may be set to a voltage that is lower than the second voltage.

Note that the relationship between the first voltage and the second voltage is not limited to such a voltage relationship.

Also, in one aspect of the invention, a storage portion that stores voltage information of the first voltage is included, and the control portion may determine whether or not the output voltage of the power receiving portion is higher than the first voltage based on the voltage information stored in the storage portion.

In this way, by changing the voltage information of the first voltage to be stored in the storage portion, the first voltage can be set to various voltages according to a situation of the contactless power transmission.

Also, another aspect of the invention relates to a power receiving device including the control device according to any of the above descriptions.

Also, another aspect of the invention relates to an electronic apparatus including the control device according to any of the above descriptions.

Also, another aspect of the invention relates to a contactless power transmission system comprising a power transmitting device and a power receiving device. The power transmitting device transmits power to the power receiving device. The power receiving device supplies power to a load based on power received by a power receiving portion that received power from the power transmitting device, and performs communication in which communication data is transmitted to the power transmitting device. The power receiving device starts the communication when an output voltage of the power receiving portion becomes higher than a first voltage. The power transmitting device receives transmitting power setting information from the power receiving device that has started the communication as the communication data, and performs control of transmitting power based on the transmitting power setting information. The power receiving device starts power supply to the load when the output voltage of the power receiving portion becomes higher than a second voltage that is different from the first voltage as a result of the power transmitting device performing control of transmitting power.

According to another aspect of the invention, when the output voltage of the power receiving portion becomes higher than the first voltage, transmitting power setting information is transmitted from the power receiving device to the power transmitting device, the power transmitting device controls the transmitting power based on the received transmitting power setting information. When the output voltage of the power receiving portion becomes higher than the second voltage as a result of controlling the transmitting power, power supply to the load is started. Accordingly, a contactless power transmission system in which the occurrence of a circuit failure can be suppressed while realizing landing detection over a large distance range or the like can be provided.

BRIEF DESCRIPTION OF THE DRAWINGS

Various embodiments of the invention will be described with reference to the accompanying drawings, wherein like numbers reference like elements.

FIG. 17 is a diagram for describing a communication method of the present embodiment.

FIG. 18 is a diagram for describing the communication method of the present embodiment.

FIGS. 19A and 19B are examples of a format of communication data.

DESCRIPTION OF EXEMPLARY EMBODIMENTS

Hereinafter, various embodiments of the invention will be described in detail. Note that the embodiments described below are not intended to unduly limit the content of one or more embodiments of the invention described in the scope of the claims, and not all configurations described in this embodiments are necessarily essential as solving means of the various embodiments of the invention.

1. Electronic Apparatus

Figure 1:
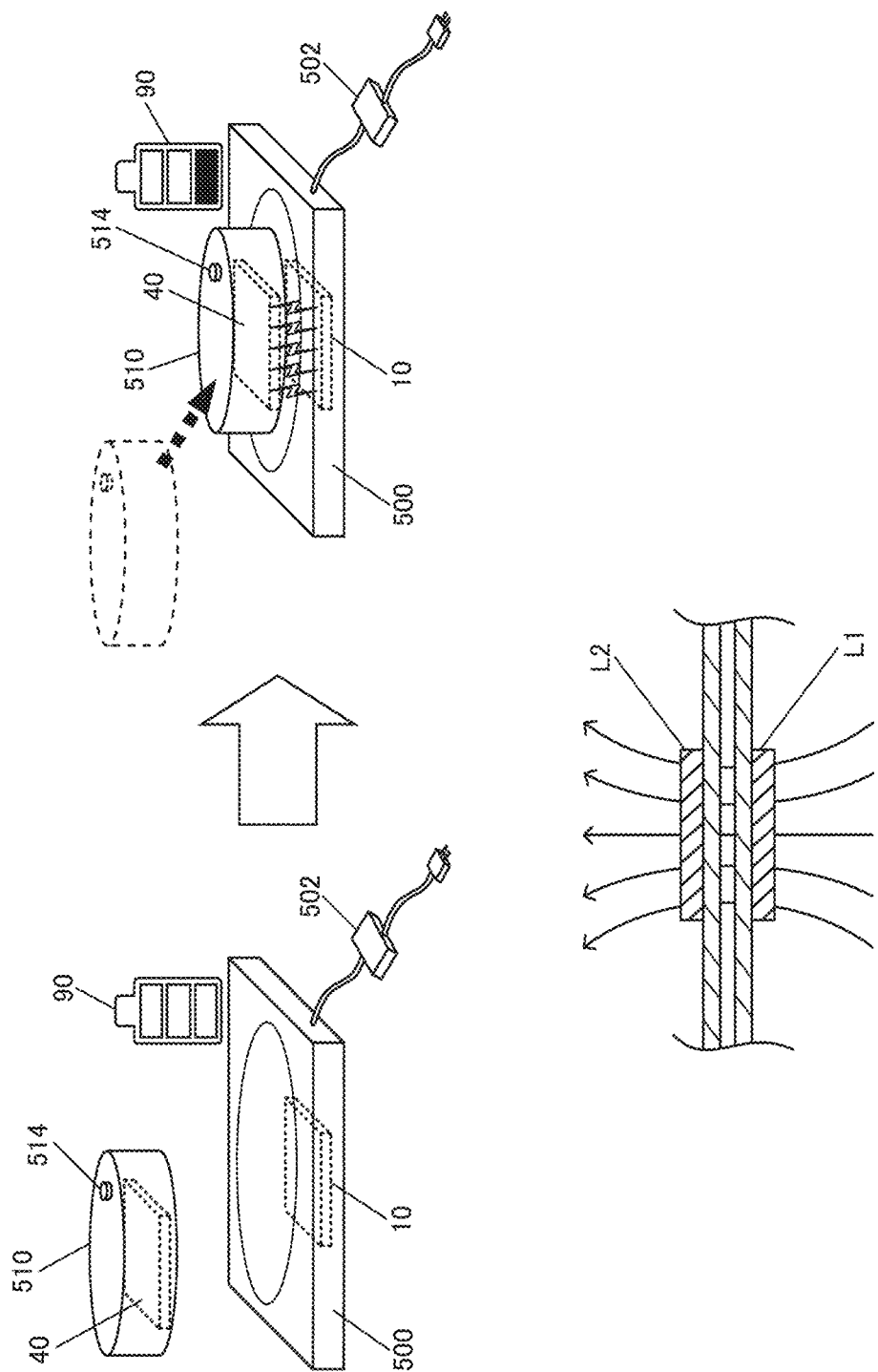
FIGS. 1A and 1B are diagrams for describing a contactless power transmission system of one embodiment.

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 (an operation portion, in a broad sense) and a battery 90. Note that, although the battery 90 is schematically illustrated in FIG. 1A, the battery 90 is, in actuality, incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus for measuring a pulse wave or the like), a mobile information terminal (such as a smartphone or a cellular phone), a cordless telephone, a shaver, an electric toothbrush, a wrist computer, a handy terminal, an onboard apparatus, a hybrid car, an electric car, an electric motorcycle, and an electric bicycle. For example, a control device (such as a power receiving device) of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses (onboard apparatuses), and travel on the ground, through the air, and on the sea, for example.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible. Note that various methods such as an electromagnetic induction method and a magnetic field resonance method can be adopted as the contactless power transmission method.

Figure 2:
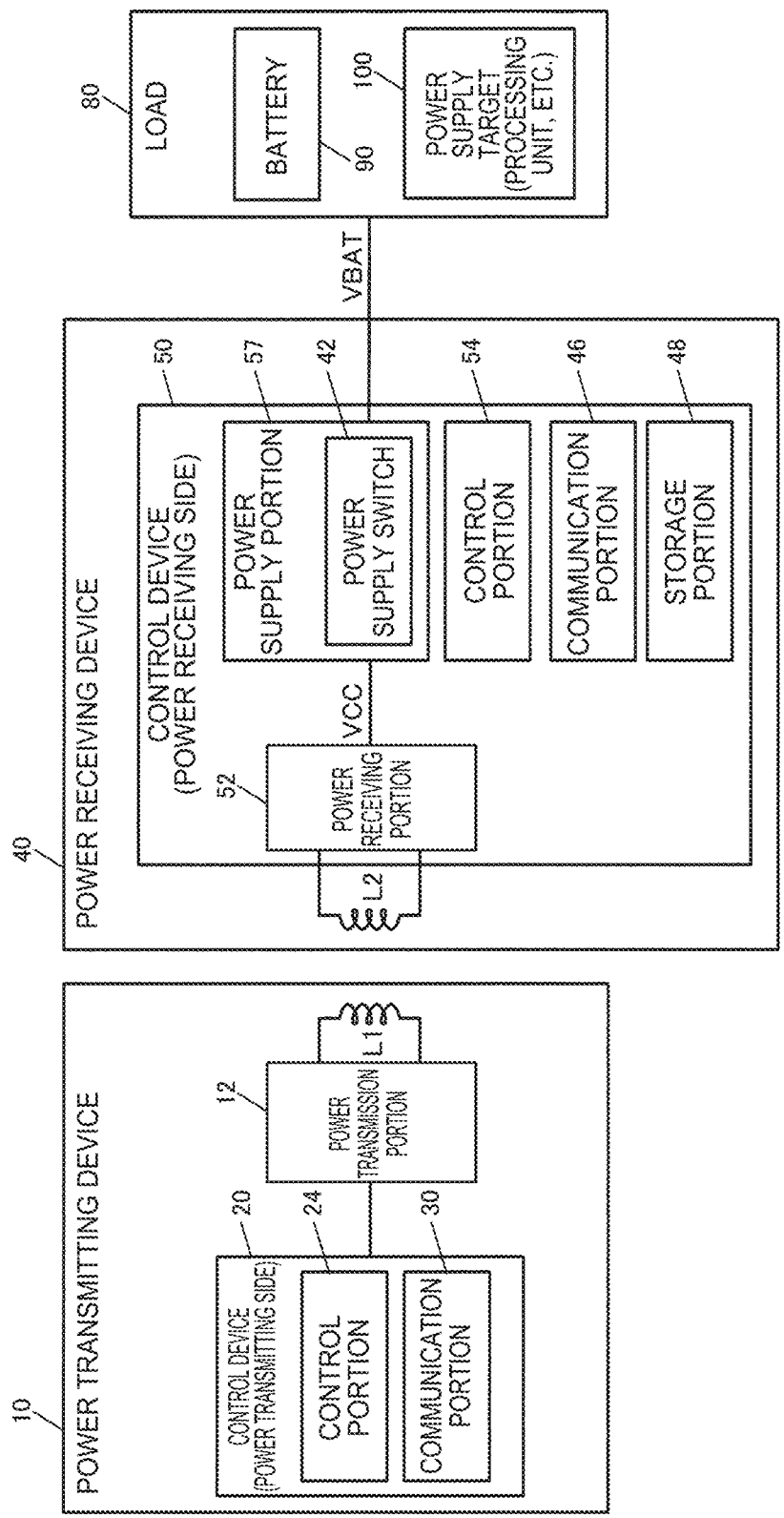
FIG. 2 is an exemplary configuration of a control device, a power transmitting device, and a power receiving device of one embodiment.

2. Configurations of Power Transmitting Device, Power Receiving Device, and Control Device An exemplary configuration of control devices 20 and 50 of the present embodiment and the power transmitting device 10 and the power receiving device 40 that respectively includes the control devices 20 and 50 is shown in FIG. 2. Note that the configuration of these devices is not limited to the configuration in FIG. 2, and various modifications can be implemented such as omitting a portion of the constituent elements, adding another constituent element (a reporting portion, for example), or changing a connection relationship.

The electronic apparatus on the power transmitting side such as the charger 500 in FIG. 1A includes the power transmitting device 10. Also, the electronic apparatus 510 on the power receiving side includes the power receiving device 40 and a load 80. The load 80 can include the battery 90 and a power supply target 100. The power supply target 100 can be various devices such as a processing unit (such as DSP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2.

The power transmitting device 10 (transmission module, primary module) includes the primary coil L1, a power transmission portion 12, and the control device 20. When power is to be transmitted, the power transmission portion 12 generates an AC voltage of a predetermined frequency and supplies the voltage to the primary coil L1. The power transmission portion 12 can include a power transmission driver that drives the primary coil L1, a power supply circuit (a power supply voltage control portion, for example) that supplies power to the power transmission driver, and at least one capacitor that constitutes a resonance circuit with the primary coil L1.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B. On the other hand, when power transmission is not needed, the electronic apparatus 510 is physically separated from the charger 500 so as to be in a state in which the magnetic flux of the primary coil L1 does not pass through the secondary coil L2.

The control device 20 performs various types of control on the power transmitting side, and can be realized by an integrated circuit device (IC) or the like. The control device 20 includes a control portion 24 and a communication portion 30. Note that a modification in which the power transmission portion 12 is incorporated in the control device 20 or the like can be implemented.

The control portion 24 executes various types of control processing of the power transmitting side control device 20. For example, the control portion 24 controls the power transmission portion 12 and the communication portion 30. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs processing for detecting and receiving communication data from the power receiving device 40.

The power receiving device 40 (power receiving module, secondary module) includes the secondary coil L2 and the control device 50. The control device 50 performs various types of control on the power receiving side, and can be realized by an integrated circuit device (IC) or the like. The control device 50 includes a power receiving portion 52, a control portion 54, and a power supply portion 57. Also, the control device 50 can include a communication portion 46 and a storage portion 48. Note that a modification in which the power receiving portion 52 is provided external to the control device 50 or the like can be implemented.

The power receiving portion 52 receives power from the power transmitting device 10. Specifically, the power receiving portion 52 converts an AC voltage induced in the secondary coil L2 to a DC rectified voltage VCC, and outputs the rectified voltage VCC.

The power supply portion 57 supplies power to the load 80 based on the power received by the power receiving portion 52. For example, the power supply portion 57 charges the battery 90 by supplying power received by the power receiving portion 52. Alternatively, the power supply portion 57 supplies power from the battery 90 or power received by the power receiving portion 52 to the power supply target 100. The power supply portion 57 includes a power supply switch 42. The power supply switch 42 is a switch (switching element, switch circuit) for supplying power received by the power receiving portion 52 to the load 80. For example, the power supply switch 42 charges the battery 90, which is the load 80, by supplying power received by the power receiving portion 52 to the battery 90.

The control portion 54 performs various types of control processing of the control device 50 on the power receiving side. For example, the control portion 54 controls the communication portion 46 and the power supply portion 57. Also, the control portion 54 can control the power receiving portion 52 and the storage portion 48. The control portion 54 can be realized by a logic circuit such as a gate array that is generated by an automated place-and-route method, or various processors such as a microcomputer, for example.

The communication portion 46 performs communication in which communication data is transmitted to the power transmitting device 10. Alternatively, the communication portion 46 may perform communication in which communication data is received from the power transmitting device 10. The communication performed by the communication portion 46 can be realized by load modulation, for example. Note that the communication method used by the communication portion 46 is not limited to load modulation. For example, the communication portion 46 may perform communication using the primary coil L1 and the secondary coil L2 with a method other than load modulation. Alternatively, a coil that is different from the primary coil L1 and the secondary coil L2 is provided, and communication may be performed with a communication method, namely load modulation or the like, using this different coil. Alternatively, communication may be performed by proximity wireless communication using RF or the like.

The storage portion 48 stores various types of information. The storage portion 48 can be realized by a nonvolatile memory, for example, but is not limited thereto. For example, the storage portion 48 may be realized by a memory (ROM, for example) other than a nonvolatile memory. Alternatively, the storage portion 48 may be realized by a circuit using a fuse element, or the like.

The load 80 includes the battery 90 and the power supply target 100. Note that a modification in which one of the battery 90 and the power supply target 100 is not provided can be implemented.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 1A) in which the power receiving device 40 is incorporated, and is a power supply target of the battery 90, for example. Note that the power received by the power receiving portion 52 may be directly supplied to the power supply target 100.

In the present embodiment, the control device 50 to be used in the power receiving device 40 that receives power from the power transmitting device 10 by contactless power transmission includes the control portion 54, the power supply portion 57, and the communication portion 46. The power supply portion 57 supplies power to the load 80 based on the power received by the power receiving portion 52 that receives power from the power transmitting device 10. For example, the power supply portion 57 charges the battery 90 by supplying power to the battery 90, which is the load 80, via the power supply switch 42. The communication portion 46 performs communication in which communication data is transmitted to the power transmitting device 10. For example, the communication portion 46 transmits communication data to the power transmitting device 10 with various communication methods such as load modulation. The control portion 54 controls the power supply portion 57 and the communication portion 46.

Also, the control portion 54 causes the communication portion 46 to start communication when the output voltage VCC (rectified voltage) of the power receiving portion 52 becomes higher than a first voltage. For example, when the output voltage VCC, which is a rectified voltage rectified by the power receiving portion 52, increases as a result of the power receiving portion 52 receiving power, the communication portion 46 does not perform communication until the output voltage VCC reaches the first voltage, and the communication portion 46 transmits communication data to the power transmitting device 10 when the output voltage VCC is higher than the first voltage.

Then, the control portion 54, after starting communication, causes the power supply portion 57 to start power supply to the load 80 when the output voltage VCC of the power receiving portion 52 becomes higher than a second voltage that is different from the first voltage. For example, even in a case where the output voltage VCC has exceeded the first voltage, and the communication portion 46 has started communication, the control portion 54 does not start power supply, and the control portion 54 starts power supply only after the output voltage VCC becomes higher than the second voltage. For example, the control portion 54 turns on the power supply switch 42, and performs charging of the battery 90 or the like by supplying power received by the power receiving portion 52 to the load 80.

In this way, in the present embodiment, the first voltage (later-described VST) at which the communication portion 46 is caused to start communication and the second voltage (later-described VCCL) at which power supply to the load 80 is started are different. Even if the output voltage VCC of the power receiving portion 52 does not exceed the second voltage, when the output voltage VCC exceeds the first voltage, the communication portion 46 is caused to start communication, and communication data is transmitted to the power transmitting device 10. Accordingly, the control device 20 (control portion 24) of the power transmitting device 10 that has received the communication data can perform various types of control for increasing the output voltage VCC on the power receiving side. For example, the control device 20 can perform control so as to increase the transmitting power by controlling the power transmission portion 12. In this way, when the output voltage VCC increases and exceeds the second voltage, the power supply switch 42 is turned on, for example, and the power received by the power receiving portion 52 is supplied to the load 80. Accordingly, even if the drive voltage (power supply voltage of the power transmission driver) of the power transmission portion 12 at the time of landing detection is not set very high, landing detection over a large distance range can be realized. Also, the drive voltage at the time of landing detection can be set to a low voltage, and therefore the occurrence of failure in a circuit due to a high VCC can be suppressed. That is, as a result of the drive voltage on the power transmitting side being set low, the voltage (VCC) on the power receiving side becomes low, and the occurrence of over-voltage on the power receiving side can be suppressed.

Here, the first voltage is a voltage at which the communication portion 46 can perform communication. For example, it is the lowest voltage at which, when the communication portion 46 on the power receiving side has transmitted communication data, the communication portion 30 on the power transmitting side can detect the communication data from the power receiving side. Also, the second voltage is a voltage higher than the operation lower limit voltage of the circuit on the power receiving side. Specifically, the second voltage is a voltage higher than a charged voltage (4.2V, for example) of the battery 90. For example, the second voltage is a chargeable voltage higher than the charged voltage, and is a voltage higher than (+0.6 V, for example) a CV charging voltage in the case of CV charging.

Also, the communication portion 46 that has been caused to start communication by the control portion 54 transmits transmitting power setting information to the power transmitting device 10 (control device 20) as the communication data. The transmitting power setting information is information for controlling the transmitting power on the power transmitting side, and is information of an output voltage VCC, which is the rectified voltage of the power receiving portion 52, as an example. The power transmitting side control device 20 (control portion 24) controls the transmitting power of the power transmission portion 12 based on the transmitting power setting information. For example, transmission power control is performed in which when the output voltage VCC becomes high, the transmitting power is reduced, and when the output voltage VCC becomes low, the transmitting power is increased.

Also, the control portion 54 causes the power supply portion 57 to start power supply to the load 80 when the output voltage VCC of the power receiving portion 52 becomes higher than the second voltage as a result of the power transmitting device 10 (control device 20) controlling transmitting power based on the transmitting power setting information. For example, the control portion 54 turns on the power supply switch 42 so as to start charging of the battery 90.

In this way, in the case where the drive voltage of the power transmission portion 12 at the time of landing detection is set low, and the output voltage VCC does not reach the second voltage as well, for example, the output voltage VCC increases as a result of the power transmitting device 10 that has received the transmitting power setting information increasing the transmitting power. Then, when the output voltage VCC exceeds the second voltage and becomes an appropriate voltage, power supply to the load 80 is started, and charging of the battery 90 or the like is started.

Also, the power transmitting device 10 performs intermittent power transmission for landing detection. For example, the power transmitting device 10 (power transmission portion 12) does not perform continuous power transmission such as normal power transmission, and performs intermittent power transmission in which power is intermittently transmitted at given intervals so as to detect landing (landing of an electronic apparatus on the power receiving side). Also, the control portion 54, when the output voltage VCC of the power receiving portion 52 becomes higher than the first voltage due to the intermittent power transmission for landing detection, causes the communication portion 46 to start communication. As a result of this communication, when the output voltage VCC increases and exceeds the second voltage, power supply to the load 80 is started. For example, when the power transmitting device 10 that has received the transmitting power setting information increases the transmitting power, and the output voltage VCC thereby increases and exceeds the second voltage, power supply to the load 80 is started, and the battery 90 is charged.

Also, the communication portion 46, when the output voltage VCC of the power receiving portion 52 becomes higher than the first voltage, transmits dummy data to the power transmitting device 10 in order for the power transmitting device 10 to determine whether landing has been detected. The power transmitting device 10 determines whether or not the electronic apparatus 510 (power receiving device) on the power receiving side has landed using this dummy data. Data having a predetermined number of bits (64 bits, for example), all bits thereof being at a predetermined logic level (logic level "0", for example), can be used as the dummy data, for example. In the case where the dummy data has p bits (p=64, for example), for example, when q bits out of p bits are detected to be at a predetermined logic level (logic level "0", for example), the power transmitting device 10 determines that landing has been detected and starts normal power transmission. Note that in the case where the communication method is load modulation, the logic level of each bit of the dummy data is represented by a load modulation pattern (a second pattern corresponding to a logic level "0", for example).

Also, the control portion 54, when the power transmitting device 10 has succeeded in detecting landing (detection of the dummy data, for example) and has replied to the power receiving device 40, allows the power supply portion 57 to supply power to the load 80 (charging of the battery). That is, the requirement for supplying power to the load 80 is that the power transmitting device 10 that has succeeded in detecting landing replies to the power receiving device 40.

The power transmitting device 10 makes the above-mentioned reply by changing the power transmission frequency, for example. Assume that the power transmission has been made with a first power transmission frequency (f1) in a normal state, for example. The power transmitting device 10 changes the power transmission frequency from the first power transmission frequency to a second power transmission frequency (f2) in a given reply period after detecting landing (after having received the dummy data). The control portion 54 on the power receiving side detects the reply from the power transmitting device 10 by measuring the power transmission frequency (power reception frequency corresponding to the power transmission frequency) and detecting the change in the power transmission frequency in a measurement period corresponding to the reply period. In the case where it has been detected that the power transmission frequency has changed from the first power transmission frequency (f1) to the second power transmission frequency (f2) in the measurement period, the control portion 54 determines that the power transmitting device 10 has replied. The control portion 54 allows the power supply to the load 80 (charging of the battery 90) on the condition of receiving such a reply.

Also, the first voltage, which is a communication start voltage, is set to be lower than the second voltage, which is a power supply start voltage. Note that the present embodiment is not limited thereto, and the first voltage may be set to be higher than the second voltage.

Also, the storage portion 48 stores voltage information of the first voltage. The storage portion 48 can be realized by a memory such as a nonvolatile memory. The control portion 54 determines whether or not the output voltage VCC of the power receiving portion 52 becomes higher than the first voltage based on the voltage information (information of the first voltage) stored in the storage portion 48. In this way, the first voltage can be set to various voltages according to the coil performance or the like by changing the voltage information of the first voltage to be stored in the storage portion 48.

Also, the contactless power transmission system of the present embodiment includes the power transmitting device 10 and the power receiving device 40. The power transmitting device 10 transmits power to the power receiving device 40. The power receiving device 40 supplies power to the load 80 based on the power received by the power receiving portion 52 that receives power from the power transmitting device 10, and performs communication in which communication data is transmitted to the power transmitting device 10. Also, the power receiving device 40 starts communication when the output voltage VCC of the power receiving portion 52 becomes higher than the first voltage. Meanwhile, the power transmitting device 10 receives the transmitting power setting information (VCC voltage information, for example) as the communication data from the power receiving device 40 that has started communication, and performs control of the transmitting power based on the transmitting power setting information. Then, the power receiving device 40 starts power supply to the load 80 when the output voltage VCC of the power receiving portion 52 becomes higher than the second voltage that is different from the first voltage as a result of the power transmitting device 10 controlling the transmitting power.

3. Method of Present Embodiment

In order to realize landing detection over a large distance range in the contactless power transmission system, the drive voltage (primary coil drive voltage) of the power transmission portion 12 needs to be set high. For example, the distance between the primary coil L1 and the secondary coil L2 is large in FIG. 3A. In a situation like this, in order to appropriately detect landing of the electronic apparatus 510 on the power receiving side on the charger 500, the drive voltage of the power transmission portion 12 needs to be set high.

Figure 3A:
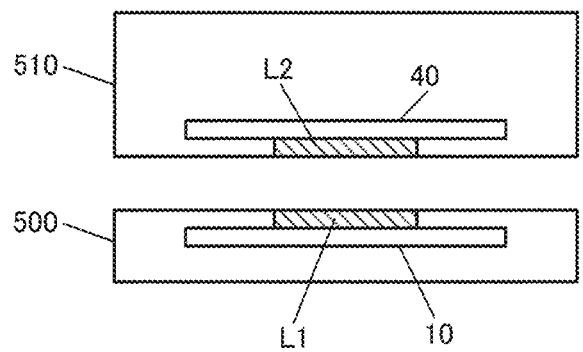
FIGS. 3A to 3C are diagrams for describing a problem of landing detection.

Note that, in the case where the direction from the primary coil L1 towards the secondary coil L2 is a Z-axis, and the directions orthogonal to the Z-axis are an X-axis and a Y-axis, FIG. 3A shows a case where the distance between coils L1 and L2 in the Z-axis direction is large. Note that FIG. 3C shows a case where the distance between coils L1 and L2 in an XY plane is large, and in this case as well, the drive voltage of the power transmission portion 12 needs to be set high in order to realize appropriate landing detection.

Figure 3B:
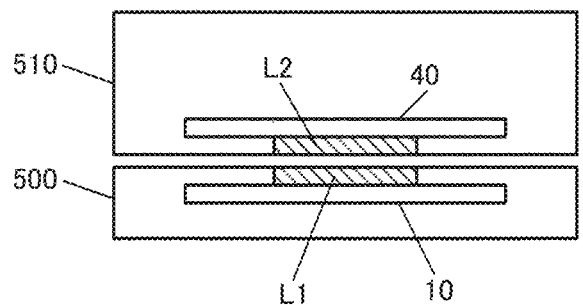
Figure 3C:
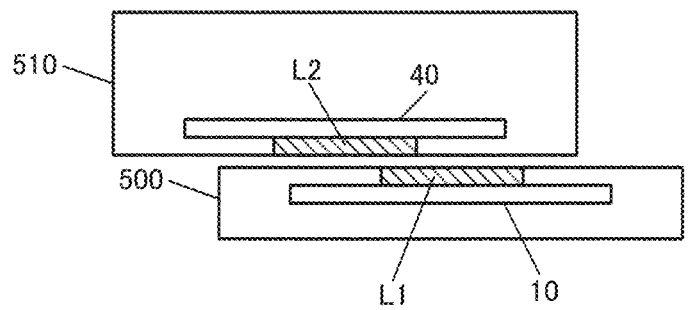

However, if the drive voltage on the power transmitting side is set high, in the case where the distance between the coils is small as in FIG. 3B, there is a risk that the voltage based on the received power exceeds the breakdown voltage of the circuit of the power receiving device 40, and a breakdown voltage abnormality occurs. For example, the circuit (such as the power supply portion, the control portion, and the communication portion) of the power receiving device 40 operates with a power supply voltage based on the output voltage VCC of the power receiving portion 52. Accordingly, when the drive voltage on the power transmitting side increases and the output voltage VCC of the power receiving portion 52 becomes a voltage that exceeds the breakdown voltage, an over-voltage is applied to transistors that constitute these circuits, and thus a failure such as breakdown or deterioration of the transistors may occur.

Therefore, in the present embodiment, the first voltage, which is a communication start voltage, and the second voltage, which is a power supply start voltage, are separately provided, and the first and second voltages are set to different voltages. Also, when the output voltage VCC of the power receiving portion 52 is higher than the first voltage, the communication portion 46 is caused to start communication, and when the output voltage VCC is higher than the second voltage, the power supply portion 57 is caused to start supplying power to the load 80.

Note that, hereinafter, a description will be given mainly taking a case where the battery 90 is charged by power supplied to the load 80 as an example. In this case, the second voltage is a charging start voltage. Specifically, the second voltage is a chargeable voltage (4.8 V, for example) that is higher than a charged voltage (4.2 V, for example) of the battery 90. Also, hereinafter, the first voltage, which is a communication start voltage, is denoted by voltage VST, and the second voltage, which is a charging start voltage, is denoted by voltage VCCL. Also, the VCC will be described as a rectified voltage, or an output voltage of the power receiving portion 52, where appropriate.

A method is conceivable in which only control is performed so as to start charging of the battery 90 when the rectified voltage VCC becomes higher than the charging start voltage VCCL, and the communication start voltage VST is not set, as a method of comparative example of the present embodiment.

However, in the method of the comparative example, the drive voltage on the power transmitting side needs to be a sufficiently high voltage such that the rectified voltage VCC exceeds the voltage VCCL so as to start charging of the battery 90, in the case where the distance between the coils is large as in FIG. 3A, for example. Accordingly, in the case where the distance between the coils is small as in FIG. 3B, for example, the above-mentioned breakdown voltage abnormality failure occurs.

In contrast, in the present embodiment, the voltage VCCL is set separately from the voltage VST. Also, a method is adopted in which, when the rectified voltage VCC exceeds the voltage VST, communication to the power transmitting side is started, and when the rectified voltage VCC exceeds the voltage VCCL, charging of the battery 90 is started.

In this way, in the case where the distance between the coils is large as in FIG. 3A, for example, communication is started as a result of the rectified voltage VCC reaching the voltage VST, and communication data is transmitted from the power receiving side to the power transmitting side, even if the drive voltage on the power transmitting side is not set very high. Then, the power transmitting side, as a result of receiving the communication data (dummy data, for example), detects landing of the power receiving side, and can start control such as transmitting power control, for example. When, as a result of the transmitting power control or the like, the rectified voltage VCC increases, the VCC exceeds the voltage VCCL, and the VCC reaches a chargeable voltage, charging of the battery 90 is started.

Therefore, according to the method of the present embodiment, the drive voltage on the power transmitting side does not need to be set very high in order to expand the distance range of landing detection, and the occurrence of failure such as breakdown voltage abnormality on the power receiving side can be suppressed. As a result, both expansion of the distance range of landing detection and suppression of the occurrence of failure such as breakdown voltage abnormality on the power receiving side can be realized.

Figure 4:
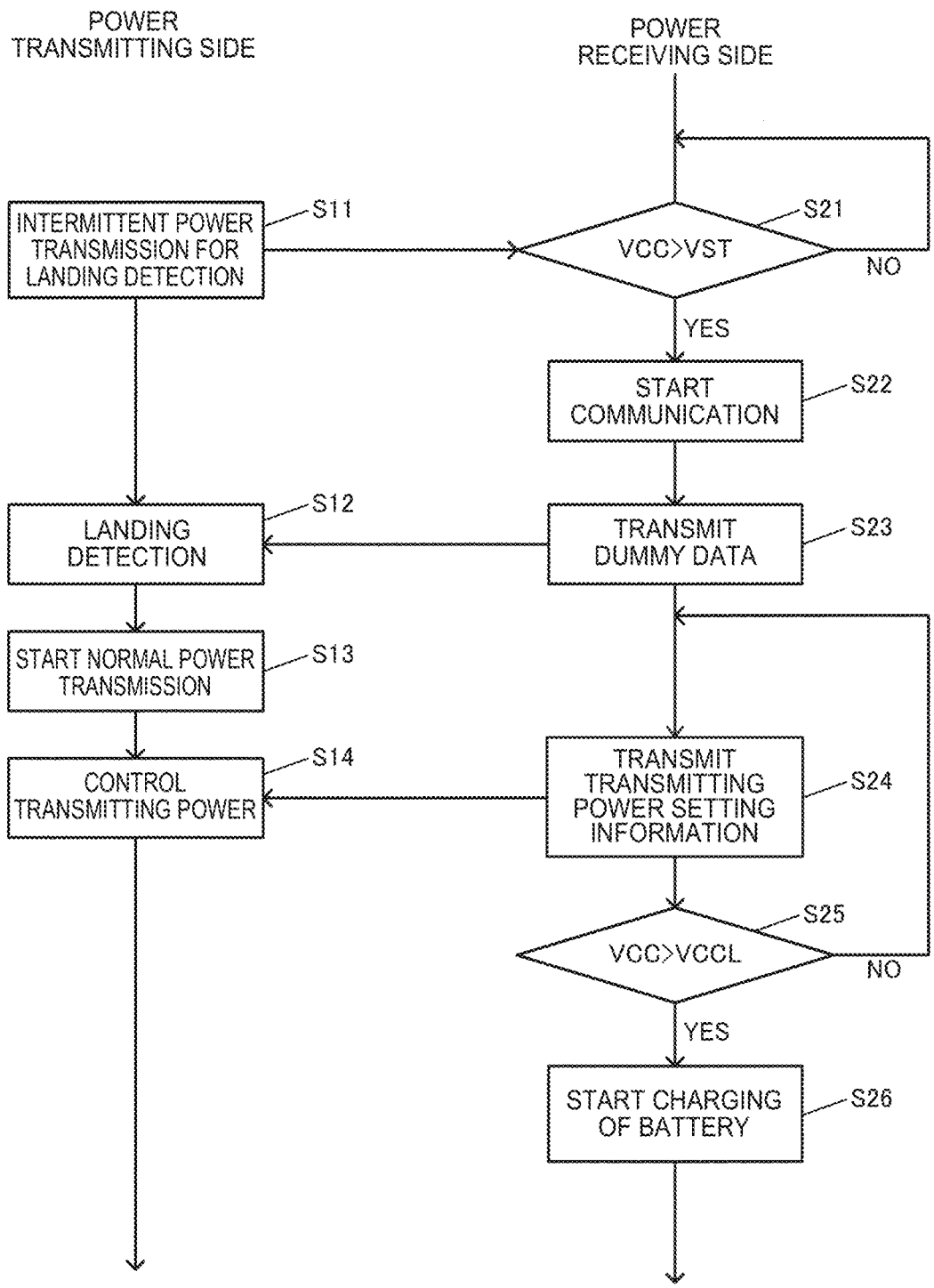
FIG. 4 is a flow diagram for describing a method of the present embodiment.

FIG. 4 is a flow diagram for describing the method of the present embodiment. First, the power transmitting side performs intermittent power transmission for landing detection (step S11). For example, as will be described later, the power transmitting side transmits power during a second period (TL2) at intervals of a first period (TL1).

The power receiving side starts communication to the power transmitting side when the rectified voltage VCC becomes higher than the voltage VST (first voltage) due to the intermittent power transmission for landing detection (steps S21 and S22). Specifically, the communication portion 46 transmits dummy data in order for the power transmitting side to determine whether landing has been detected (step S23).

The power transmitting side that has received the dummy data (communication data, in a broad sense) detects landing of the power receiving side as a result of detecting the dummy data (step S12). Then, the power transmitting side starts normal power transmission, which is continuous power transmission, that is different from the intermittent power transmission (step S13).

The power receiving side, after having transmitted the dummy data for landing detection, transmits the transmitting power setting information (step S24). For example, the power receiving side transmits voltage information of the VCC as the transmitting power setting information. Then, the power transmitting side that has received the transmitting power setting information controls the transmitting power of the power transmission portion 12 based on the transmitting power setting information (step S14).

When the drive voltage (primary coil voltage) of the power transmitting side increases as a result of controlling the transmitting power, the rectified voltage VCC of the power receiving portion 52 that receives the transmitting power also increases. For example, when the amplitude of a power transmission signal waveform increases as a result of the increase in the drive voltage, the amplitude of a power reception signal waveform also increases, and the rectified voltage VCC resulting from rectifying the power reception signal waveform also increases. Then, when the VCC becomes higher than the VCCL, charging of the battery 90 is started (steps S25 and S26).

According to the present embodiment, the drive voltage of the power transmitting side in the intermittent power transmission for landing detection in step S11 in FIG. 4 does not need to be set to a very high voltage. For example, even in a case where the distance between the coils is large as in FIG. 3A, and the drive voltage of the power transmitting side is not a very high voltage, as a result of the rectified voltage VCC becoming higher than the voltage VST in step S21 in FIG. 4, communication from the power receiving side to the power transmitting side is started. Then, the power transmitting side detects landing of the power receiving side (S12) based on the communication data (dummy data) from the power receiving side (S23). Next, as a result of the power transmitting side controlling the transmitting power (S14) based on the transmitting power setting information from the power receiving side (S24), the rectified voltage VCC of the power receiving side increases. Then, as a result of the rectified voltage VCC becoming higher than the voltage VCCL (S25), charging of the battery 90 is started (S26). Therefore, according to the present embodiment, both the landing detection over a large distance range and suppression of the occurrence of breakdown voltage abnormality of the power receiving side can be realized.

Figures 5, 6:
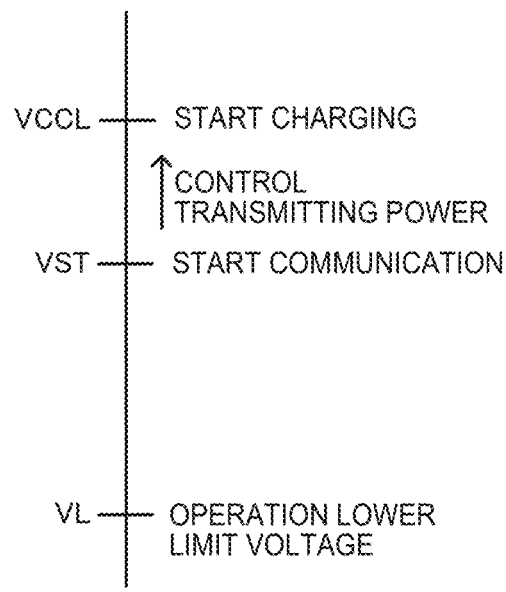
FIG. 5 is a diagram for describing a voltage relationship between a first voltage, a second voltage, and an operation lower limit voltage.
FIG. 6 is a diagram for describing voltage information that is to be stored in a storage portion.

One example of a relationship between the voltages VST and VCCL and the operation lower limit voltage VL is shown in FIG. 5. The operation lower limit voltage VL (minimum operating voltage) is a voltage at which normal operation of a circuit can be ensured, and is the lower limit power supply voltage necessary for the operation of the circuit (power supply portion, control portion, communication portion) of the power receiving side. The operation lower limit voltage VL is a voltage (about 0.9 to 1.4V, for example) corresponding to the sum of a threshold voltage of N-type transistors and a threshold voltage of P-type transistors that constitute the circuit, for example.

The voltage VST, which is a communication start voltage, and the voltage VCCL, which is a charging start voltage (power supply start voltage), are voltages sufficiently higher than the operation lower limit voltage VL. Also, the voltage VCCL (second voltage) is a voltage higher than the voltage VST (first voltage) in FIG. 5. One example is that the operation lower limit voltage VL is about 0.9 to 1.4 V, the voltage VST is about 4.5 V, and the voltage VCCL is about 4.8V, and a relationship VL<VST<VCCL holds.

Note that a relationship VST<VCCL may not necessarily hold in the present embodiment. For example, the state of the contactless power transmission at the start of communication is different from the state of the contactless power transmission at the start of charging. For example, charging of the battery 90 (power supply to the load) is not performed at the start of communication, and therefore voltage lowering of the VCC due to a charging current flowing to the battery 90 does not occur. On the other hand, voltage lowering of the VCC due to the charging current flowing to the battery 90 occurs at the start of charging. Therefore, the voltages VST and VCCL may be set such that the relationship VST>VCCL holds, taking influence of this voltage lowering into consideration.

Also, the value of the voltage VST at the start of communication is influenced by the performance of the coils used for contactless power transmission. For example, in the case where the coil performance is high, communication between the power receiving side and the power transmitting side by load modulation or the like is made possible even if the voltage VST is not set to a very high voltage. On the other hand, in the case where the coil performance is low and the voltage VST is set to a low voltage, if the distance between the coils is large as shown in FIG. 3A, for example, communication between the power receiving side and the power transmitting side by load modulation or the like becomes difficult. Accordingly, it is desirable that the voltage VST can be set so as to correspond to the performance of coils that are used.

Thus, in the present embodiment, the storage portion 48 stores voltage information of the VST (first voltage). For example, the storage portion 48 constituted by a nonvolatile memory stores the voltage information of the VST, for example. It is determined whether or not the VCC has become higher than the VST based on the voltage information of the VST stored in the storage portion 48. Accordingly, the VST can be set to a voltage corresponding to the coil performance or the like.

For example, an exemplary setting of voltage information of the VST that is set to the storage portion 48 is shown in FIG. 6. In FIG. 6, 4.5 V, 5.0 V, 5.5 V, and 6.0 V can be set as the voltage of the VST. The voltage of the VST is set by the setting of DVST[1:0], which is voltage information, for example.

In the case where the coil performance is high, VST=4.5V is set by setting DVST[1:0]=0. In this case, a relationship VST<VCCL (=4.8 V) holds. On the other hand, in the case where the coil performance is not very high, the VST is set to 5 V, 5.5 V, and 6.0 V by setting the DVST[1:0] to 1, 2, and 3, respectively. In these cases, the relationship VST<VCCL does not hold. Note that, even if VST=5 V is set, for example, the VCC decreases, as described above, at the start of charging, due to the charging current flowing. Therefore, after communication has been started at VST=5.0 V, the VCC once decreases to a voltage that is lower than 5.0 V (4.0 V, for example) at the start of charging, and thereafter the VCC again exceeds the voltage VCCL, and thus charging of the battery 90 is started.

Also, in the present embodiment, when the rectified voltage VCC becomes higher than the voltage VST due to the intermittent power transmission for landing detection, communication is started and dummy data for landing detection is transmitted from the power receiving side to the power transmitting side as the communication data. The power transmitting side detects landing of the power receiving side by detecting the dummy data. Then, the power transmitting side, upon succeeding in detecting landing, makes a reply to the power receiving side, and the power receiving side starts charging of the battery 90 by starting power supply to the load 90, on the condition that the power transmitting side made a reply.

Figure 7:
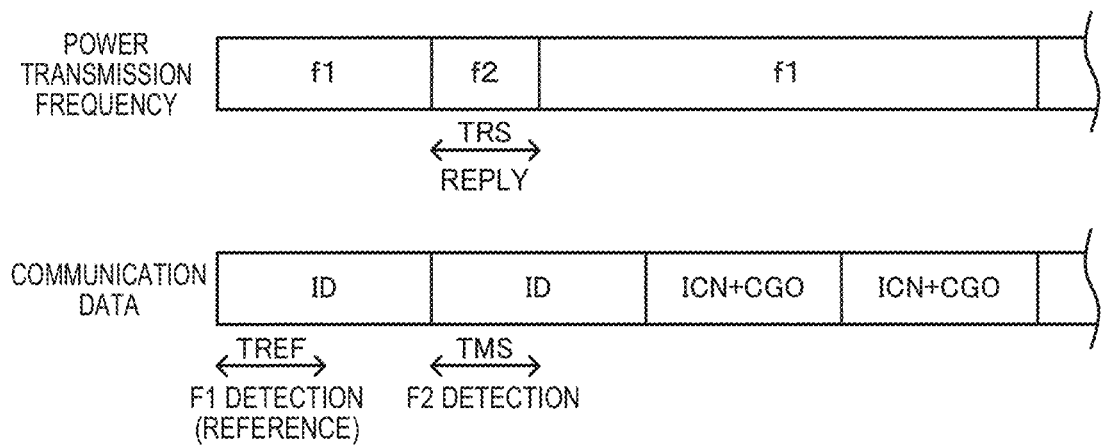
FIG. 7 is a diagram for describing a reply method of the power transmitting device.

FIG. 7 is a diagram for describing an example of the method of reply performed by the power transmitting side, for example. The power transmitting side transmits power with a power transmission frequency fck=f1 in a normal state, for example. The power receiving side, after having transmitted the dummy data for landing detection, transmits ID information (authentication information, ID code) for authenticating the power transmitting device 10 (charger) to the power transmitting side. In FIG. 7, the power receiving side transmits the ID information twice. The power transmitting side that has checked the first ID information makes a reply with respect to the authentication by the ID information by changing the power transmission frequency fck from f1 to f2 in a response period TRS in the second ID communication period. The power receiving side determines that landing has occurred on a proper power transmitting device 10 (charger) in the case where the power transmitting side has made such a reply. Accordingly, simplified authentication processing can be realized. The power receiving side, upon the authentication being successful, transmits an IC number (ICN) and a charging execution flag (CGO) to the power transmitting side.

Specifically, in FIG. 7, the power receiving side detects the power transmission frequency fck=f1 in a period TREF in the first ID communication period. Then, the power receiving side detects the power transmission frequency fck=f2 in a period TMS in the second ID communication period using the fck=f1 in the period TREF as a reference frequency. The power receiving side determines that the power transmitting side has made a reply in the case where the power transmission frequency fck=f2 is detected in the period TMS.

For example, the control device 50 on the power receiving side shapes a coil end signal that appears at one end of the secondary coil L2 using a hysteresis-type comparator, for example, and thereby extracts a rectangular wave signal that corresponds to the power transmission signal waveform (power reception signal waveform). Then, the control device 50 measures the power transmission frequency fck using the extracted rectangular wave signal. Specifically, the control device 50 on the power receiving side includes an oscillator circuit (CR oscillator circuit, for example) therein, and measures the power transmission frequency fck (power reception frequency corresponding to the power transmission frequency) by performing measurement in which the length of a power transmission period T=1/fck (32×T, specifically) is measured by counting a clock signal generated based on an oscillation signal of the oscillator circuit. Note that the reply of the power transmitting side is not limited to the reply by a change in the power transmission frequency, and the reply may be a reply by a change in the duty ratio or a change in the amplitude of the power transmission signal waveform, for example.

Figure 8:
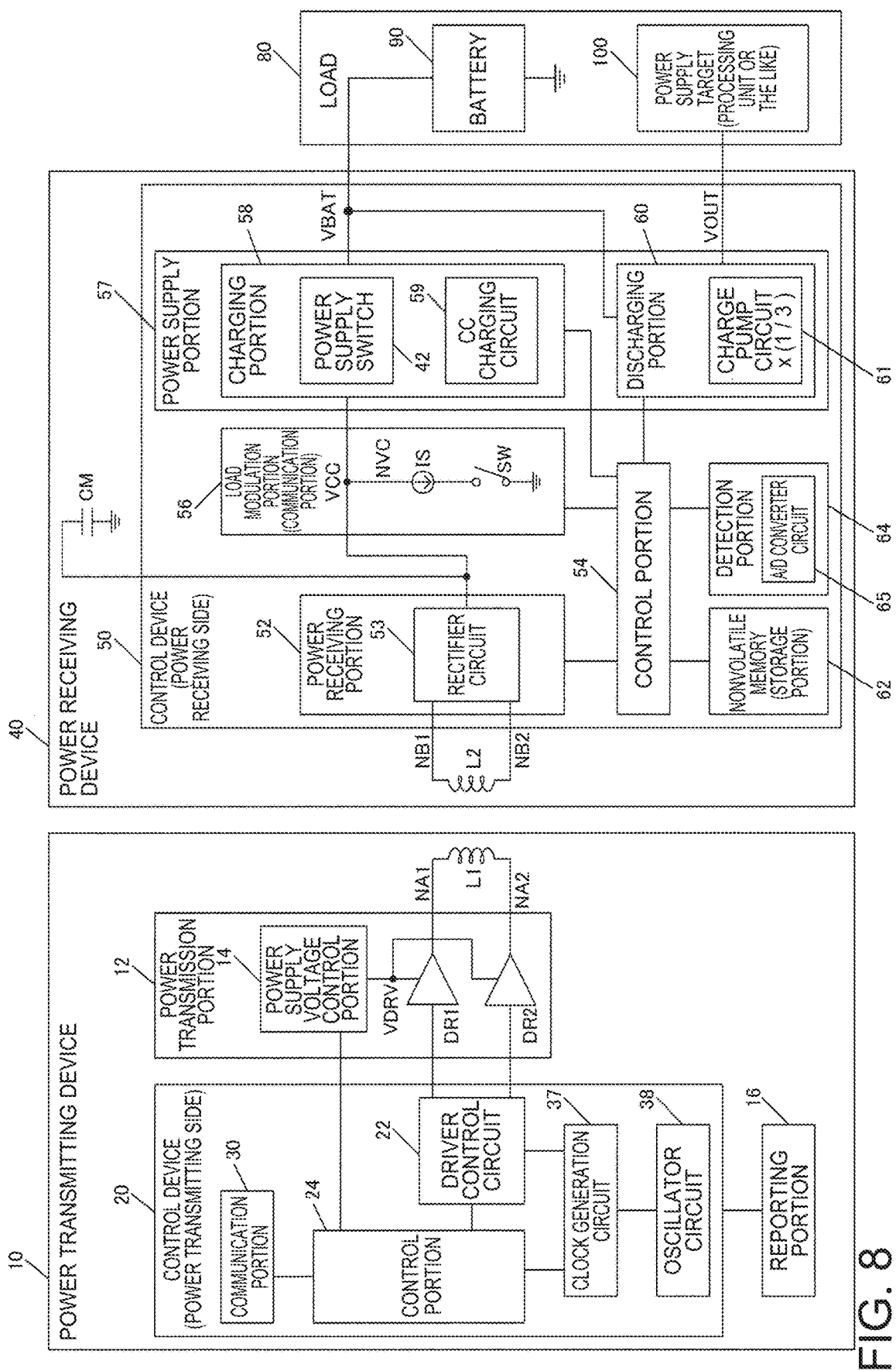
FIG. 8 is a detailed exemplary configuration of the control device, the power transmitting device, and the power receiving device of one embodiment.

4. Detailed Exemplary Configuration of Power Transmitting Device, Power Receiving Device, and Control Device A detailed exemplary configuration of the control devices 20 and 50 of the present embodiment and the power transmitting device 10 and the power receiving device 40 including the same is shown in FIG. 8. Note that a detailed description of configurations of FIG. 8 that are similar to those of FIG. 2 will be omitted.

In FIG. 8, the power transmission portion 12 includes a first transmission driver DR1 that drives one end of the primary coil L1, a second transmission driver DR2 that drives the other end of the primary coil L1, and a power supply voltage control portion 14. Each of the transmission drivers DR1 and DR2 is realized by an inverter circuit (buffer circuit) or the like that is constituted by a power MOS transistor, for example. These transmission drivers DR1 and DR2 are controlled (driven) by a driver control circuit 22 in the control device 20. That is, the control portion 24 controls the power transmission portion 12 via the driver control circuit 22.

The power supply voltage control portion 14 controls a power supply voltage VDRV of the power transmission drivers DR1 and DR2. For example, a control portion 24 controls the power supply voltage control portion 14 based on communication data (transmitting power setting information) received from the power receiving side. Accordingly, the power supply voltage VDRV supplied to the power transmission drivers DR1 and DR2 is controlled, and variable control of the transmitting power is realized, for example. The power supply voltage control portion 14 can be realized by a DC/DC converter or the like. For example, the power supply voltage control portion 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control portion 14 increases the power supply voltage VDRV that is supplied to the power transmission drivers DR1 and DR2, and when decreasing the transmitting power, the power supply voltage control portion 14 decreases the power supply voltage VDRV.

A reporting portion 16 (display portion) reports (displays) various states (being in power transmission, ID authentication or the like) of the contactless power transmission system using light, sound, an image or the like, and is realized by an LED, a buzzer, an LCD or the like, for example.

The power transmitting side control device 20 includes the driver control circuit 22, the control portion 24, the communication portion 30, a clock generation circuit 37, and an oscillator circuit 38. The driver control circuit 22 (pre-driver) controls the transmission drivers DR1 and DR2. For example, the driver control circuit 22 outputs a control signal (drive signal) to the gates of transistors that constitute the power transmission drivers DR1 and DR2, and causes the power transmission drivers DR1 and DR2 to drive the primary coil L1. The oscillator circuit 38 is constituted by a crystal-oscillator circuit or the like, and generates a clock signal for the primary side. The clock generation circuit 37 generates a drive clock signal that defines a power transmission frequency (drive frequency), or the like. Also, the driver control circuit 22 generates a control signal having a given frequency (power transmission frequency), based on the drive clock signal and the control signal from the control portion 24, and outputs the control signal to the power transmission drivers DR1 and DR2 in the power transmission portion 12 for control.

The control device 50 on the power receiving side includes the power receiving portion 52, the control portion 54, a load modulation portion 56, the power supply portion 57, a nonvolatile memory 62, and a detection portion 64.

The power receiving portion 52 includes a rectifier circuit 53 constituted by a plurality of transistors and diodes. The rectifier circuit 53 converts an AC induced voltage in the secondary coil L2 to a DC rectified voltage VCC, and outputs the rectified voltage VCC.

The load modulation portion 56 (communication portion, in a broad sense) performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example.

The switching element SW is turned on and off based on a control signal from the control portion 54, for example, and a current (constant current) of the current source IS that flows from the node NVC to GND is caused to flow or be cut off, and thus the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 8, and various modifications such as using a resistor in place of the current source IS can be implemented.

The power supply portion 57 includes a charging portion 58 and a discharging portion 60. The charging portion 58 performs charging of the battery 90 (charging control). For example, the charging portion 58 is supplied with a voltage that is based on the rectified voltage VCC (DC voltage, in a broad sense) from the power receiving portion 52, and charges the battery 90. The charging portion 58 can include a power supply switch 42 and a CC charging circuit 59. The CC charging circuit 59 is a circuit that performs CC (Constant-Current) charging of the battery 90.

The discharging portion 60 performs a discharging operation for discharging the battery 90. For example, the discharging portion 60 performs the discharging operation for discharging the battery 90, and supplies power from the battery 90 to the power supply target 100. For example, the discharging portion 60 is supplied with a battery voltage VBAT from the battery 90, and supplies an output voltage VOUT to the power supply target 100. The discharging portion 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging portion 60 (charge pump circuit) operates with the battery voltage VBAT, for example, as the power supply voltage.

The nonvolatile memory 62 (storage portion, in a broad sense) is a nonvolatile memory device that stores various types of information. The nonvolatile memory 62 stores various types of information such as status information of the power receiving device 40, for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the battery voltage VBAT, and the like. Specifically, the detection portion 64 includes an A/D converter circuit 65, performs A/D conversion on voltages based on the rectified voltage VCC and the battery voltage VBAT, a temperature detection voltage from an unshown temperature detection portion, and the like by using the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64.

In FIG. 8, the load modulation portion 56 starts load modulation when the output voltage VCC of the power receiving portion 52 becomes higher than the first voltage (VST) and landing is detected, and stops the load modulation when removal is detected. Specifically, the load modulation portion 56 starts the load modulation when landing of the electronic apparatus 510 is detected. The power transmitting device 10 (control portion 24) starts normal power transmission with the power transmission portion 12 on the condition that the power receiving device 40 (load modulation portion 56) has started the load modulation. Also, when removal of the electronic apparatus 510 is detected, the load modulation portion 56 stops the load modulation. The power transmitting device 10 (control portion 24) continues the normal power transmission by the power transmission portion 12 while the load modulation continues. That is, when the load modulation is no longer detected, the normal power transmission is caused to stop, and the power transmission portion 12 is caused to perform intermittent power transmission for landing detection, for example. In this case, the control portion 54 on the power receiving side can perform the landing detection and the removal detection based on the output voltage VCC of the power receiving portion 52.

Also, in FIG. 8, the communication portion 46 in FIG. 2 is realized by the load modulation portion 56 that transmits communication data by the load modulation. Specifically, the load modulation portion 56 performs load modulation such that the load modulation pattern constituted by a first load state and a second load state is a first pattern (first bit pattern) for a first logic level ("1", for example) of the communication data (bits of communication data) that is to be transmitted to the power transmitting device 10 (control device 20). On the other hand, the load modulation portion 56 performs load modulation such that the load modulation pattern is a second pattern (second bit pattern) that is different from the first pattern for a second logic level ("0", for example) of the communication data (bits of communication data) that is to be transmitted to the power transmitting device 10.

Meanwhile, the communication portion 30 on the power transmitting side determines that the communication data is communication data of the first logic level if the load modulation pattern is the first pattern. The communication portion 30 determines that the communication data is communication data of the second logic level if the load modulation pattern is the second pattern.

Here, the first pattern is a pattern in which the duration of a period in the first load state is longer than that in the second pattern, for example. For example, the communication portion 30 performs sampling of the load modulation pattern at given sampling intervals from a first sampling point set in a period in the first load state in the first pattern, and takes in communication data having the given number of bits (16 bits or 64 bits, for example).

With a method in which such a load modulation pattern is used, detection sensitivity with respect to the load change by the load modulation and noise immunity in detection can be improved. Accordingly, the first voltage, which is a communication start voltage (load modulation start voltage) can be set to a low voltage. As a result, it becomes possible to start communication upon detecting landing over a large distance range, and the power transmitting side is caused to perform control for charging the battery 90 (transmitting power control, for example).

Also, the power supply portion 57 includes the charging portion 58 that charges the battery 90 based on the power received by the power receiving portion 52, and the discharging portion 60 that performs a discharging operation of the battery 90 and supplies the power from the battery 90 to the power supply target 100.

Also, the control portion 54 (discharging system control portion) stops the discharging operation of the discharging portion 60 when landing is detected. That is, when landing of the electronic apparatus 510 is detected in FIG. 1A, the discharging operation (supply of VOUT) of the discharging portion 60 is stopped, and the power of the battery 90 is not discharged to the power supply target 100. Also, the control portion 54 causes the discharging portion 60 to perform the discharging operation in a removed period (a period in which the electronic apparatus 510 is removed). Due to this discharging operation, the power of the battery 90 is supplied to the power supply target 100 via the discharging portion 60.

5. Operation Sequence of Contactless Power Transmission System

Figure 9:
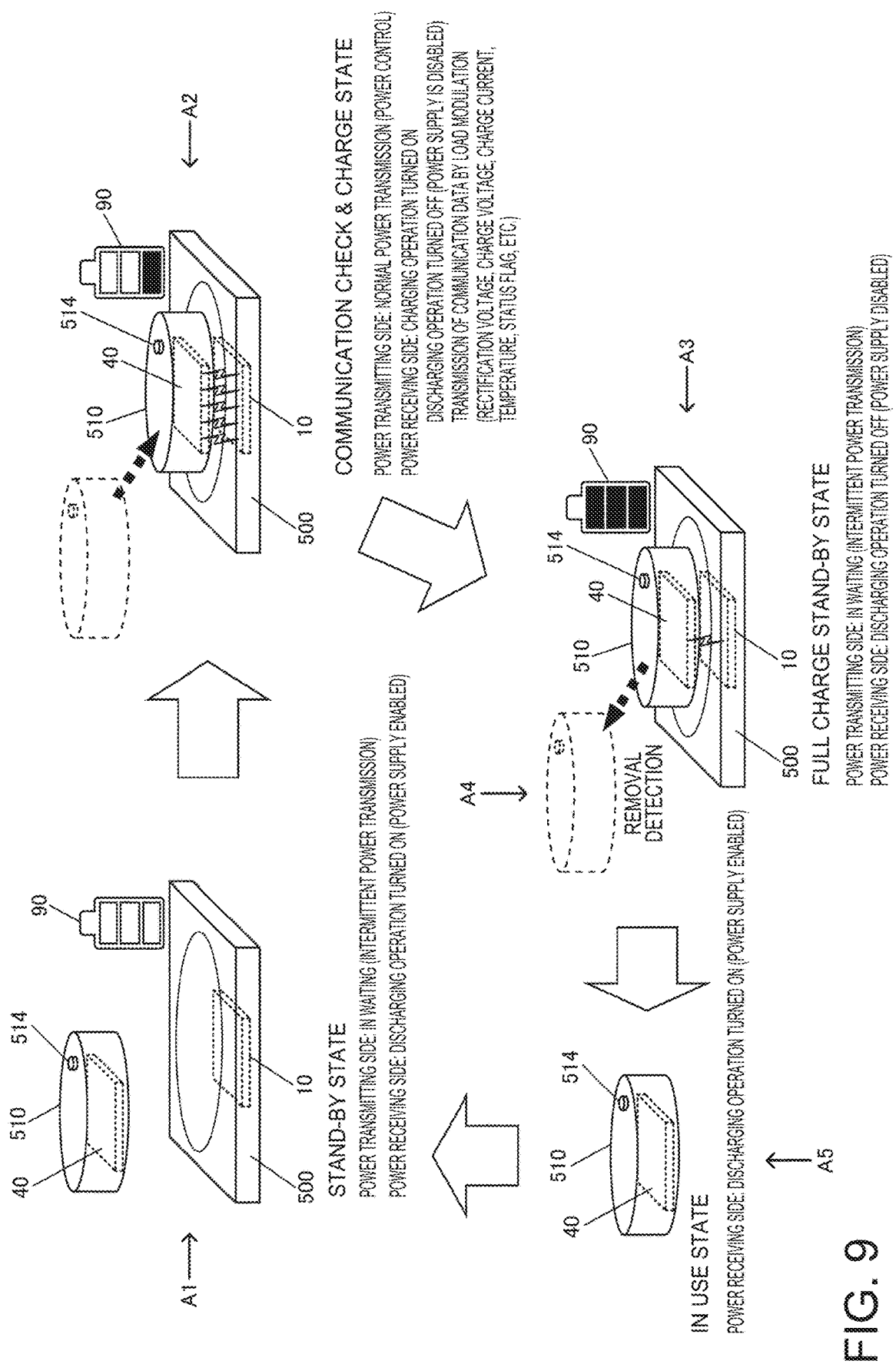
FIG. 9 is a diagram for describing an example of an operation sequence of the contactless power transmission system.

Next, an example of an operation sequence of the contactless power transmission system of the present embodiment will be described. FIG. 9 is a diagram for describing an outline of an operation sequence.

In A1 in FIG. 9, the electronic apparatus 510 including the power receiving device 40 is not placed on the charger 500 including the power transmitting device 10, and is in a removed state. In this case, a stand-by state is realized. In the stand-by state, the power transmission portion 12 in the power transmitting device 10 is in a state in which landing of the electronic apparatus 510 is detected by performing intermittent power transmission for landing detection. Also, in the stand-by state, the discharging operation to the power supply target 100 is turned on in the power receiving device 40, and the power supply to the power supply target 100 is enabled. Accordingly, the power supply target 100 such as a processing unit is supplied with the power from the battery 90, and can operate.

As shown in A2 in FIG. 9, when the electronic apparatus 510 is placed on the charger 500, and landing is detected, a communication check & charge state is realized. In the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC, which is the output voltage from the power receiving portion 52. The charge state of the battery 90 can be determined based on the information such as the battery voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including power transmission status information (such as VCC), charge status information (such as VBAT and various status flags), and information such as a temperature is transmitted from the power receiving side to the power transmitting side by regular load modulation in a normal power transmission period.

As shown in A3 in FIG. 9, when full charge of the battery 90 is detected, a full charge stand-by state is realized. In the full charge stand-by state, the power transmission portion 12 is in a state in which intermittent power transmission for removal detection is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 9, the electronic apparatus 510 is in a use state, and the discharging operation of the power receiving side is turned on, as shown in A5 in FIG. 9. Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates using the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 9. Also, when landing is detected, the discharging operation of the discharging portion 60 is stopped. In this regular load modulation, communication data including information for controlling power on the power transmitting side, and information representing the status on the power receiving side are transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 9. When removal is detected and the removed period begins, the discharging operation of the discharging portion 60 is performed, as shown in A4 and A5 in FIG. 9. Accordingly, power from the battery 90 is supplied to the power supply target 100, and normal operation of the electronic apparatus 510 becomes possible. Note that landing detection and removal detection are performed based on the output voltage VCC of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and normal operation of the power supply target 100 such as a processing unit (DSP) becomes possible. In this way, an operation sequence of preferable contactless power transmission can be realized in a type of electronic apparatus 510 (electronic apparatus such as a hearing aid or a wearable apparatus that is worn by a user, for example) that does not operate in the charge period during which the electronic apparatus 510 is placed on the charger 500, for example.

Figure 10:
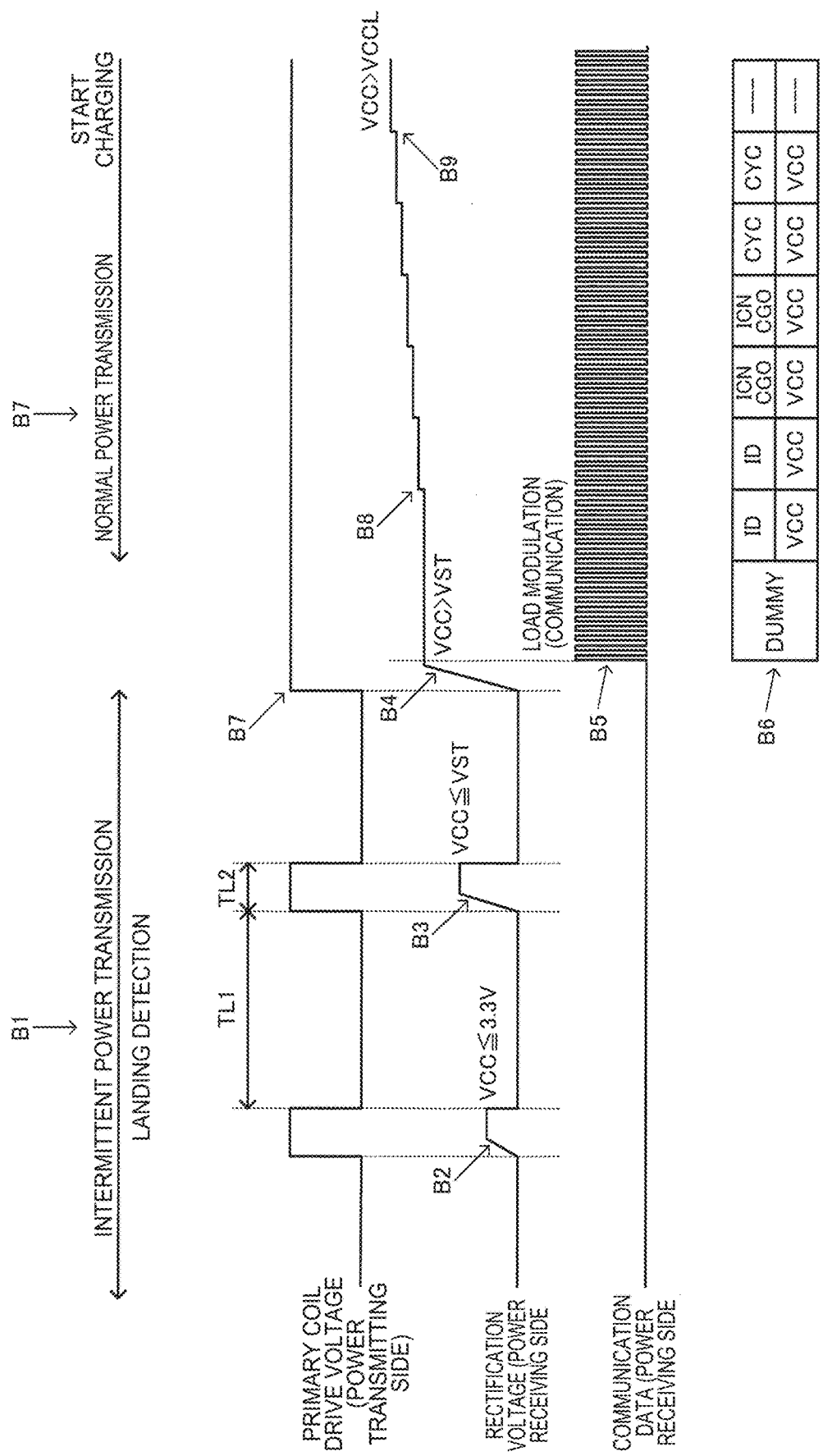
FIG. 10 is a signal waveform diagram for describing an operation sequence at the time of landing detection.
Figure 11:
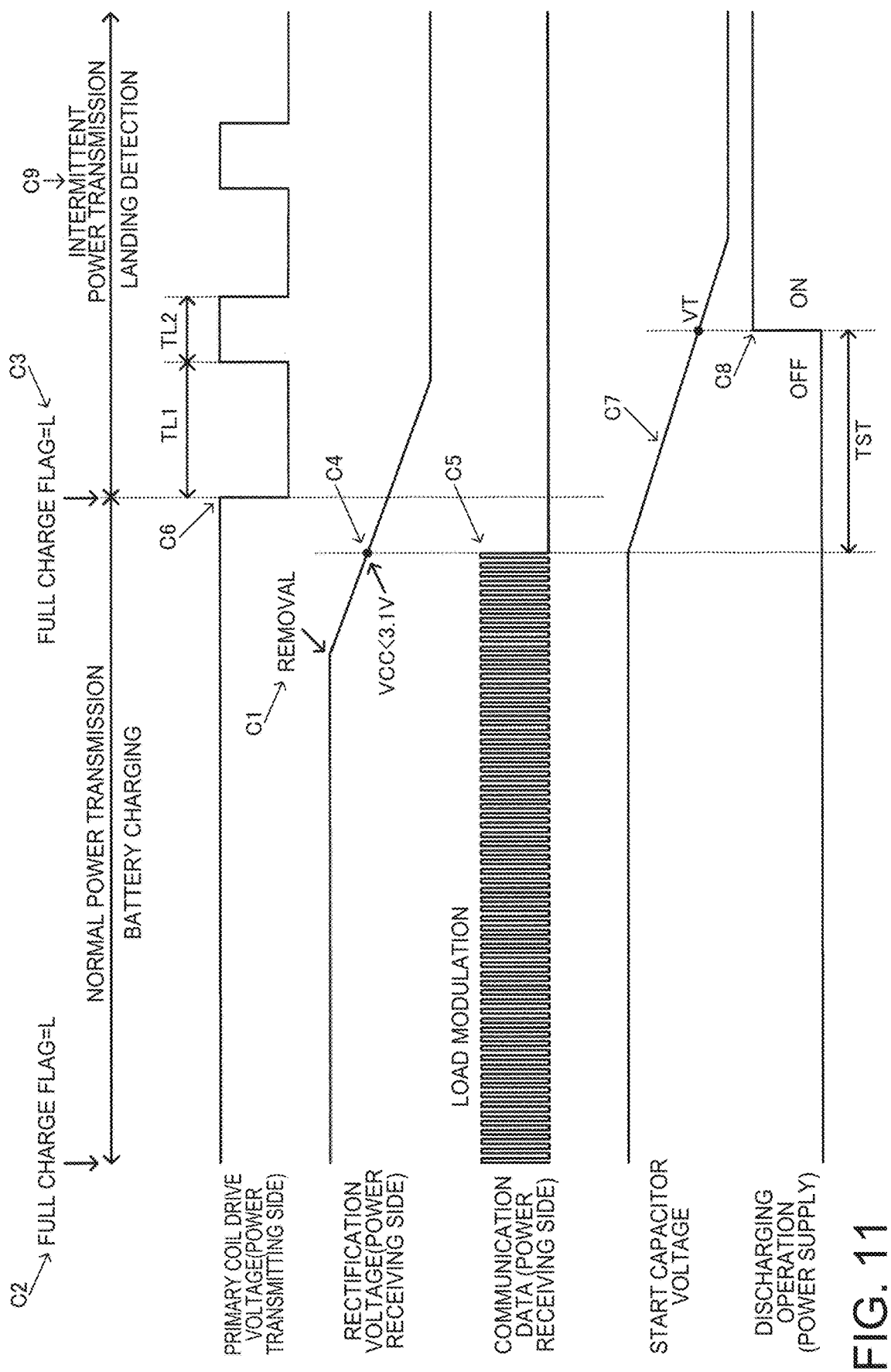
FIG. 11 is a signal waveform diagram for describing an operation sequence at the time of removal.
Figure 12:
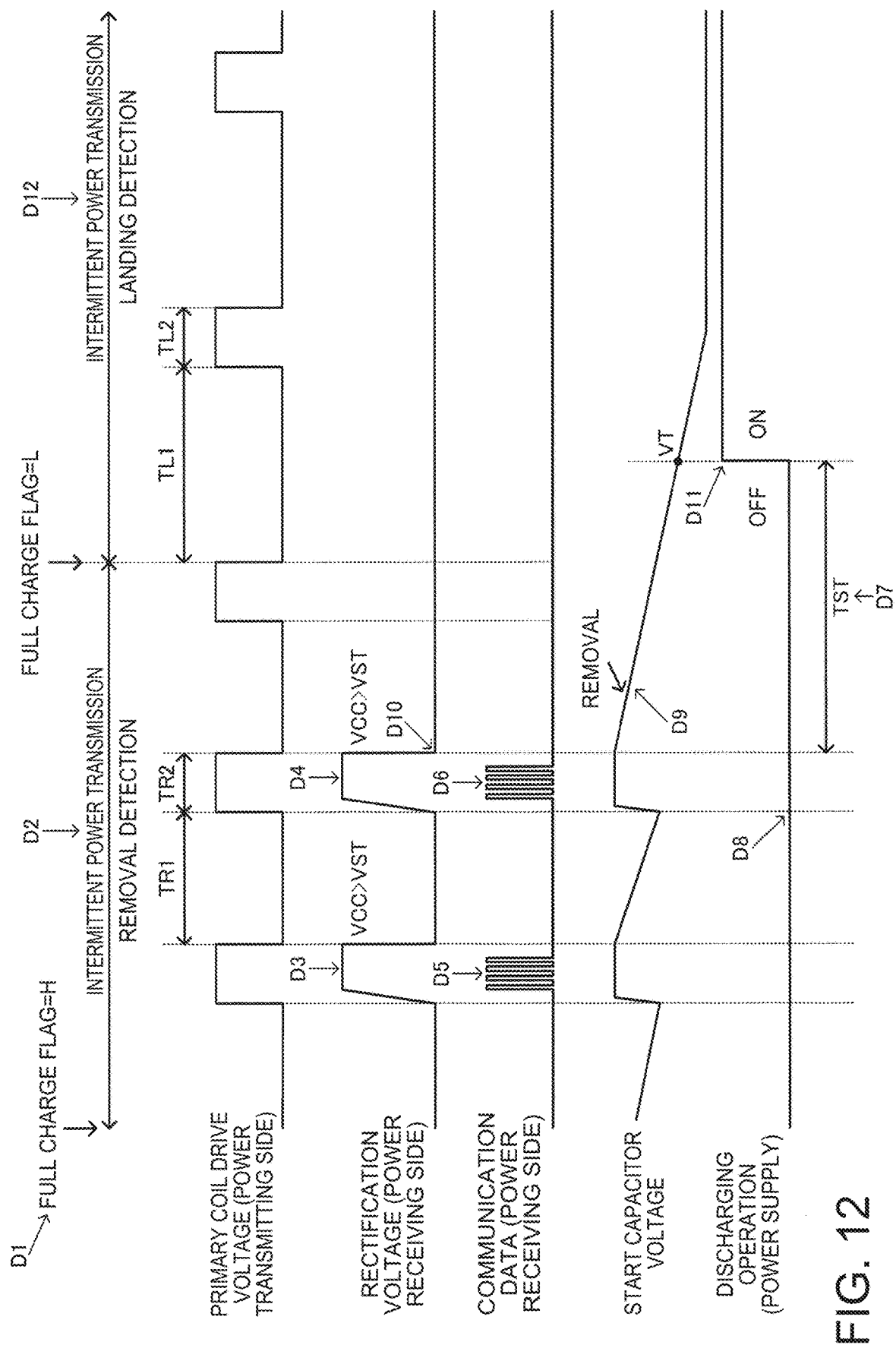
FIG. 12 is a signal waveform diagram for describing the operation sequence at the time of removal.

FIGS. 10 to 12 are signal waveform diagrams for describing a detailed operation sequence of the contactless power transmission system of the present embodiment.

B1 in FIG. 10 is the stand-by state in A1 in FIG. 9, and intermittent power transmission for landing detection is performed. That is, power transmission in a period TL2 is performed at the intervals of a period TL1. The period of TL1 is 3 s for example, and the period of TL2 is 50 ms for example. In B2 and B3 in FIG. 10, the rectified voltage VCC is less than or equal to the voltage VST (less than or equal to the first voltage), and therefore, communication by load modulation is not performed.

On the other hand, in B4, the rectified voltage VCC exceeds the voltage VST (4.5 V, for example), and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds the voltage VST, and load modulation is started, as shown in B5. Then, communication data as shown in B6 is transmitted to the power transmitting side by this load modulation. The start of the load modulation in B5 is triggered by the increase in the rectified voltage VCC due to the intermittent power transmission for landing detection shown in B7.

Specifically, the power receiving side transmits dummy data (64 bits of "0", for example) for landing detection. The power transmitting side detects landing of the power receiving side by detecting this dummy data (detecting 8 bits of "0", for example), and starts normal power transmission (continuous power transmission) as shown in B7.

Next, the power receiving side transmits information such as ID information or rectified voltage VCC. As described above, simplified authentication processing can be realized as a result of the power transmitting side making a reply with respect to the transmission of the ID information.

Also, the power transmitting side controls the transmitting power by receiving the transmitting power setting information, which is information of the rectified voltage VCC. As a result of the power transmitting side controlling the transmitting power, the rectified voltage VCC increases as shown in B8. Then, when the VCC exceeds the voltage VCCL (second voltage), as shown in B9, charging of the battery 90 is started.

In the present embodiment in this way, the voltage VST at which the load modulation (communication) is started can be set low. Accordingly, the occurrence of a failure such as a breakdown voltage abnormality caused by the drive voltage of the power transmitting side being set high can be suppressed. The transmitting power of the power transmitting side is controlled by transmitting the transmitting power setting information (VCC) to the power transmitting side by the started load modulation, and as a result of controlling the transmitting power, the rectified voltage VCC increases, as shown in B8. Then, when the rectified voltage VCC increases and exceeds the voltage VCCL, which is a chargeable voltage, as shown in B9, charging of the battery 90 is started. Accordingly, both of the landing detection over a large distance range and suppression of the occurrence of failure such as a breakdown voltage abnormality can be realized.

In C1 in FIG. 11, the electronic apparatus 510 is removed in a normal power transmission period during which charging of the battery 90 is performed. The removal in C1 is removal before the battery 90 is fully charged (full charge flag=Low level), as shown in C2 and C3.

When the electronic apparatus 510 is removed in this way, the power on the power transmitting side is not transmitted to the power receiving side, and the rectified voltage VCC decreases. Then, when VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the power receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Also, the power transmission portion 12 starts to perform intermittent power transmission for landing detection, as shown in C9, after normal power transmission has been stopped.

Note that, in the present embodiment, a charging system control portion and a discharging system control portion are provided as the control portion 54 on the power receiving side. The charging system control portion operates by receiving a power supply voltage generated from the rectified voltage VCC (output voltage) of the power receiving portion 52. Meanwhile, the discharging system control portion and the discharging portion 60 operate by receiving a power supply voltage generated from the battery voltage VBAT. Charging/discharging control of the start capacitor and control of the discharging portion 60 (on/off control) are performed by the discharging system control portion.

In D1 in FIG. 12, the full charge flag is at a high level which is an active level, and the full charge of the battery 90 is detected. When the full charge is detected in this way, the intermittent power transmission for removal detection after full charge is performed, as shown in D2. That is, power transmission is performed during a period TR2 at the intervals of a period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC of the power receiving portion 52 increases above VST due to the intermittent power transmission for removal detection, as shown in D3 and D4 in FIG. 12, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (longer than 3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 starts to be performed.

In the present embodiment as described above, on the condition that the power receiving device 40 has started the load modulation, as shown in B5 in FIG. 10, normal power transmission by the power transmission portion 12 is started, as shown in B7. While the load modulation in B5 continues, the normal power transmission shown in B7 continues. Specifically, as shown in C5 in FIG. 11, in the case where load modulation is no longer detected, normal power transmission by the power transmission portion 12 is stopped as shown in C6. Then, intermittent power transmission for landing detection by the power transmission portion 12 starts to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, contactless power transmission and communication by load modulation can be realized in a simple operation sequence. Also, as a result of performing communication by regular load modulation during a normal power transmission period, effective contactless power transmission according to the state of the power transmission or the like can be realized.

6. Communication Method

Figure 13:
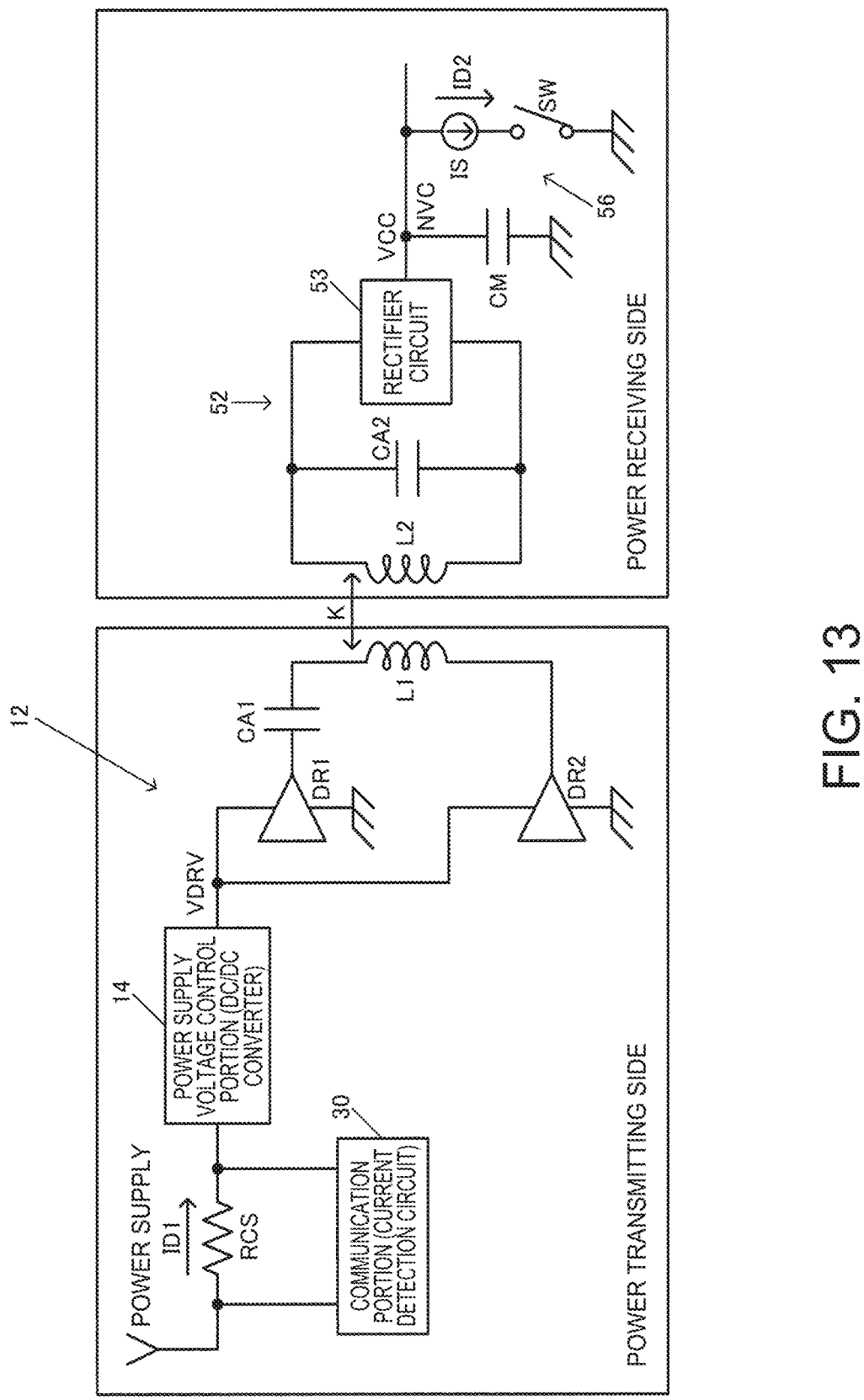
FIG. 13 is a diagram for describing a communication method using load modulation.

FIG. 13 is a diagram for describing a communication method by load modulation. The power transmission drivers DR1 and DR2 drive the primary coil L1 on the power transmitting side based on the power supply voltage VDRV supplied from the power supply voltage control portion 14, as shown in FIG. 13.

Meanwhile, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and a capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control portion 14. A power supply voltage is supplied from the power supply to the power supply voltage control portion 14 via the sense resistor RCS. A current ID1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result.

Figure 14:
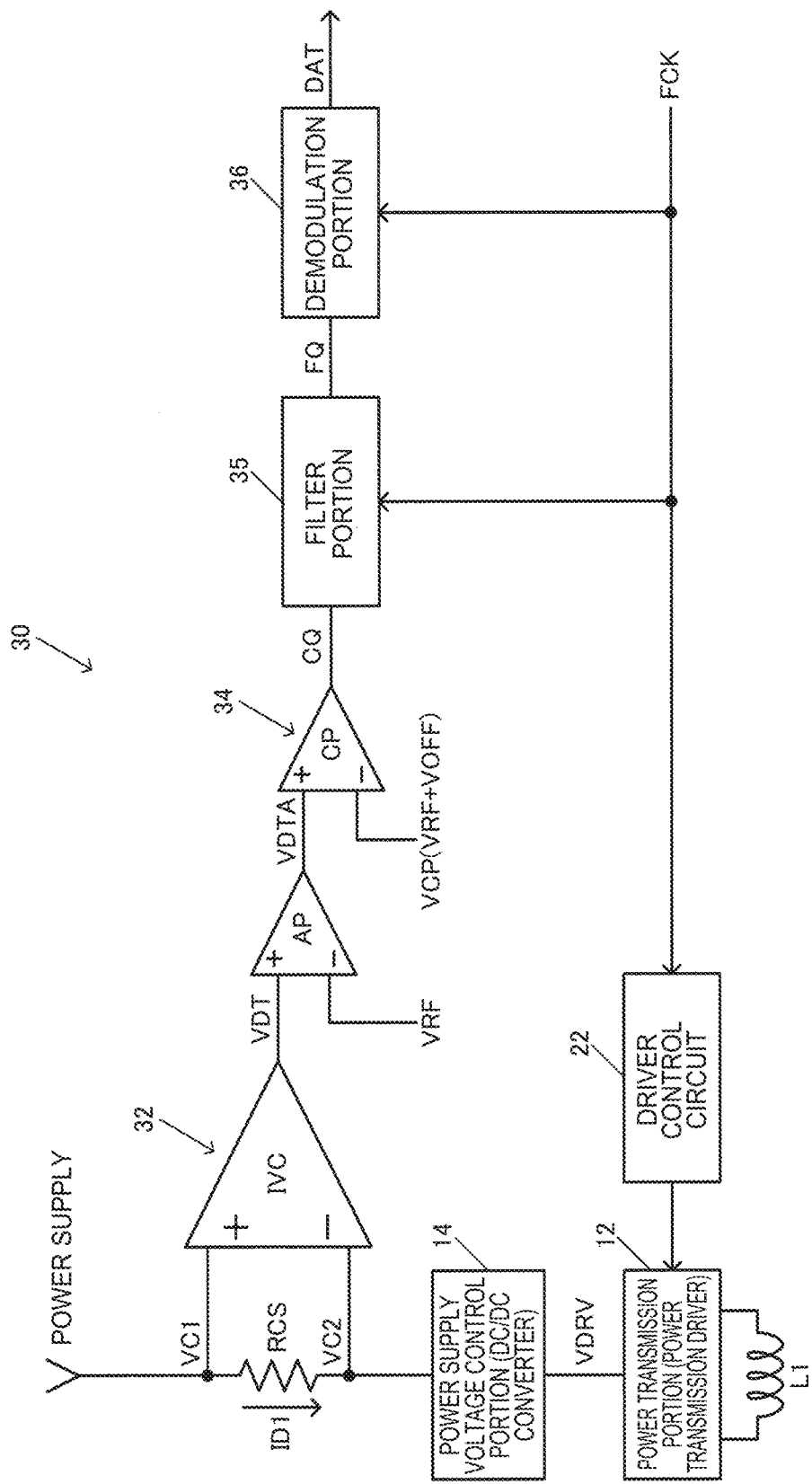
FIG. 14 is an exemplary configuration of a communication portion on a power transmitting side.

An example of the specific configuration of the communication portion 30 is shown in FIG. 14. The communication portion 30 includes a current detection circuit 32, a comparator circuit 34, and a demodulation portion 36. Also, the communication portion 30 can include an amplifier AP for signal amplification and a filter portion 35.

The current detection circuit 32 detects the current ID1 that flows from the power supply (power supply device) to the power transmission portion 12 via the power supply voltage control portion 14. The current ID1 may include a current that flows through the driver control circuit 22 and the like, for example. The current detection circuit 32 is constituted by an IV conversion amplifier IVC. The IV conversion amplifier IVC amplifies a minute voltage VC1-VC2 that is generated by the minute current ID1 that flows in the sense resistor RCS, and outputs the amplified voltage as the detection voltage VDT. The amplifier AP outputs a signal of detection voltage VDTA that is a result of amplifying the detection voltage VDT using the reference voltage VRF as a reference, to the comparator circuit 34.

A comparator circuit 34 compares the detection voltage VDTA generated by the current detection circuit 32 with a judgement voltage VCP=VRF+VOFF, and outputs a comparison result CQ. The comparator circuit 34 can be constituted by a comparator CP. In this case, the voltage VOFF in the judgement voltage VCP=VRF+VOFF can be realized by an offset voltage of the comparator CP or the like, for example.

The demodulation portion 36 detects communication data by performing processing of demodulating the load modulation pattern based on the comparison result CQ (comparison result FQ after filtering processing) of the comparator circuit 34, and outputs the communication data as a detection data DAT. The filter portion 35 is provided between the comparator circuit 34 and the demodulation portion 36, and the demodulation portion 36 performs processing of demodulating the load modulation pattern based on the comparison result FQ after filtering processing by the filter portion 35.

The filter portion 35 and the demodulation portion 36 operate by receiving a drive clock signal FCK, for example. The drive clock signal FCK is a signal for defining a power transmission frequency, and the driver control circuit 22 drives the power transmission drivers DR1 and DR2 in the power transmission portion 12 by receiving the drive clock signal FCK.

Figure 15:
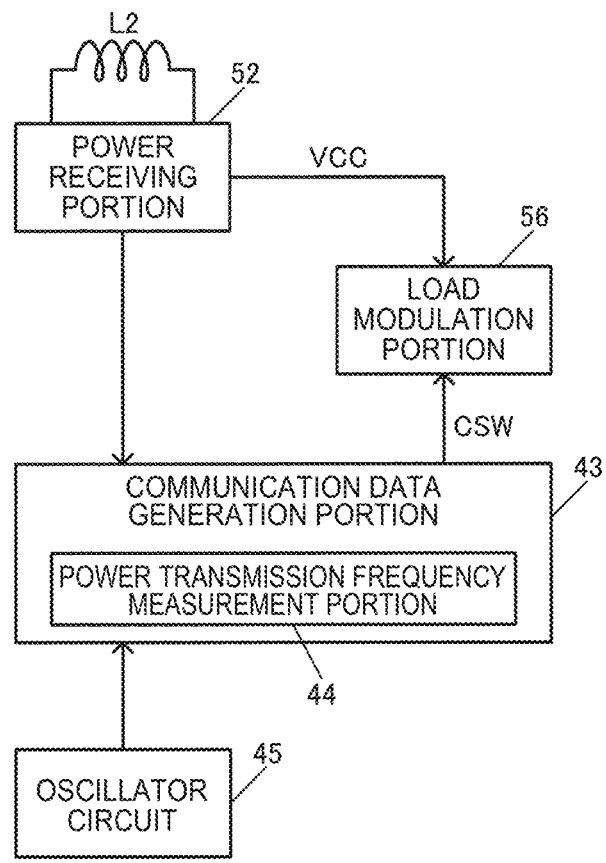
FIG. 15 is a diagram for describing a communication configuration on a power receiving side.

FIG. 15 is a diagram for describing a communication configuration on the power receiving side. The power receiving portion 52 extracts a rectangular wave signal corresponding to the power transmission signal waveform by shaping a coil end signal of the secondary coil L2, and supplies the rectangular wave signal to the communication data generation portion 43. The communication data generation portion 43 is provided in the control portion 54, and includes a power transmission frequency measurement portion 44. The power transmission frequency measurement portion 44 measures the power transmission frequency by measuring the period of the rectangular wave signal corresponding to the power transmission signal waveform by counting a clock signal generated by the oscillator circuit 45. Also, the communication data generation portion 43 generates a control signal CSW for transmitting communication data based on the measured power transmission frequency, and outputs the control signal CSW to the load modulation portion 56. Also, the switching element SW is subjected to on/off control by the control signal CSW, for example, and the load modulation portion 56 is caused to perform load modulation corresponding to the communication data.

The load modulation portion 56 performs load modulation by changing the load state (load by load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise. That is, even if load modulation is performed on the power receiving side, the current ID1 that flows in the sense resistor RCS on the power transmitting side due to this load modulation becomes a very minute current. Therefore, if noise is superimposed, a data detection error occurs, and a communication error due to noise or the like occurs.

Figure 16:
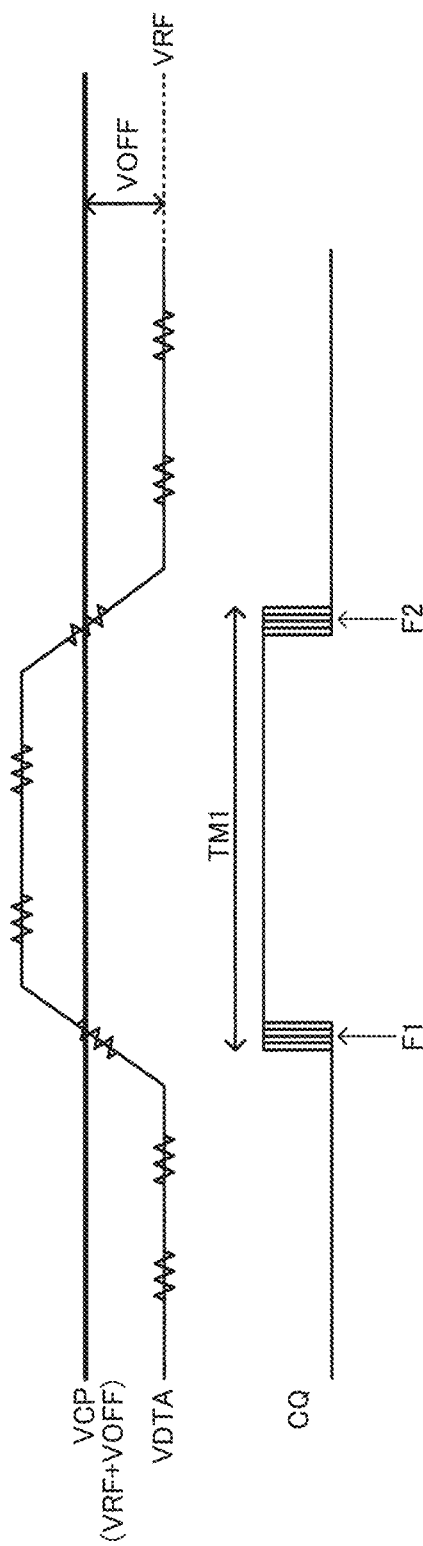
FIG. 16 is a diagram for describing a problem caused by noise when communication is performed.

For example, FIG. 16 is a diagram schematically illustrating signal waveforms of the detection voltage VDTA, the judgement voltage VCP, and the comparison judgement result CQ of the comparator circuit 34. As shown in FIG. 16, the detection voltage VDTA is a voltage signal that changes with reference to the reference voltage VRF, and the judgement voltage VCP is a voltage signal in which the offset voltage VOFF of the comparator CP is added to the reference voltage VRF.

As shown in FIG. 16, when noise is superimposed on the detection voltage VDTA signal, for example, edge positions of the comparison result CQ signal change as illustrated in F1 and F2, and the width (period) of a period TM1 changes so as to increase or decrease. For example, assuming that the period TM1 is a period corresponding to the logic level "1", if the width of the period TM1 changes, a sampling error of the communication data occurs, and a communication data detection error occurs. Specifically, in the case where communication is performed by performing regular load modulation in a normal power transmission period, noise superimposed on the communication data may possibly increase, the probability that detection error of the communication data occurs increases.

In the present embodiment, a method is adopted in which the logic level "1" (data 1) or the logic level "0" (data 0) of each bit in the communication data is transmitted from the power receiving side using a load modulation pattern, and is detected on the power transmitting side.

Specifically, as shown in FIG. 17, the load modulation portion 56 on the power receiving side performs load modulation such that the load modulation pattern is a first pattern PT1 for a first logic level "1" of the communication data that is to be transmitted to the power transmitting device 10. On the other hand, the load modulation portion 56 on the power receiving side performs load modulation such that the load modulation pattern is a second pattern PT2 that is different from the first pattern PT1 for a second logic level "0" of the communication data.

The communication portion 30 (demodulation portion) on the power transmitting side determines that the communication data is communication data of the first logic level "1" if the load modulation pattern is the first pattern PT1. On the other hand, the communication portion 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation portion 56 is a high load, for example. Specifically, in FIG. 17, a period TM1 in the first load state is a period in which the switching element SW in the load modulation portion 56 is turned on and the current of the current source IS flows from the node NVC to the GND side, and is a period corresponding to a high level (bit=1) in the first and second patterns PT1 and PT2.

On the other hand, the second load state is a state where the load on the power receiving side set by the load modulation portion 56 is a low load, for example. Specifically, in FIG. 17, a period TM2 in the second load state is a period in which the switching element SW in the load modulation portion 56 is turned off, and is a period corresponding to a low level (bit=0) in the first and second patterns PT1 and PT2.

In FIG. 17, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 17, the first pattern PT1 is a pattern corresponding to a bit pattern (1110), for example. The second pattern PT2 is a pattern corresponding to a bit pattern (1010), for example. In these bit patterns, bit=1 corresponds to a state in which the switching element SW in the load modulation portion 56 is turned on, and bit=0 corresponds to a state in which the switching element SW in the load modulation portion 56 is turned off.

For example, in the case where the bit in communication data to be transmitted is a logic level "1", the switching element SW in the load modulation portion 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in communication data to be transmitted is a logic level "0", the switching element SW in the load modulation portion 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the power transmission frequency (frequency of the drive clock signal FCK) in the power transmission portion 12 is fck, and the power transmission period is T=1/fck, the length of each of the first and second patterns PT1 and PT2 is expressed as 512×T, for example. In this case, the length of one bit section can be expressed as (512×T)/4=128×T. Accordingly, in the case where the bit in the communication data is at a logic level "1", the switching element SW in the load modulation portion 56 is turned on and off, on the power receiving side, in the bit pattern (1110) that corresponds to the first pattern PT1 at an interval 128×T, for example. Also, in the case where the bit in the communication data is at a logic level "0", the switching element SW in the load modulation portion 56 is turned on and off, on the power receiving side, in the bit pattern (1010) that corresponds to the second pattern PT2 at the interval 128×T, for example.

On the other hand, a detection operation and fetching processing for communication data are performed on the power transmitting side by a method shown in FIG. 18, for example. For example, the communication portion 30 (demodulation portion) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 18 are sampling points that are set at sampling intervals SI. The sampling interval SI is an interval that corresponds to the length of the load modulation pattern. For example, in FIG. 17, the length of each of the first and second patterns PT1 and PT2 is 512×T (=512/fck), and therefore the length of the sampling interval SI is also 512×T.

In FIG. 18, the load modulation patterns in the periods TS1, TS2, TS3, TS4, TS5, and TS6 are respectively PT1, PT2, PT1, PT2, PT2, and PT2. Accordingly, in the case shown in FIG. 18, communication data (101000) having a number of bits=6, for example, is taken in by performing sampling on the load modulation pattern from the first sampling point SP1 at the sampling intervals SI.

Specifically, in the case where the width of the period TM1 in the first load state is within a first range width (220×T to 511×T), the first sampling point SP1 is set within the period TM1 in the first load state, as shown in FIG. 18. That is, in the case where the width of the period TM1 in which the signal level is at a high level is within the first range width, bit synchronization is performed, and the first sampling point SP1 is set at the center point, for example, of the period TM1. Then, sampling is performed at the sampling intervals SI from the set first sampling point SP1. Then, if the level of the signal that has been taken in is at a high level (first load state), the logic level is determined to be "1" (first pattern PT1), and if the level of the signal that has been taken in is at a low level (second load state), the logic level is determined to be "0" (second pattern PT2).

Here, the first range width (220×T to 511×T) is a range width that is set corresponding to the period TM1 (384×T) in the first load state in the first pattern PT1. That is, the width of the period TM1 fluctuates caused by noise or the like, as described in FIG. 16. A typical value of the width of the period TM1 in the first pattern PT1 is a width 128×3×T=384×T that corresponds to an amount of 3 bits (111). Accordingly, the first range width 220×T to 511×T is set so as to include this 384×T. The period of a high level within the first range width 220×T to 511×T is determined to be the period TM1 in the first pattern PT1, and bit synchronization for setting the first sampling point SP1 is performed. In this way, even in a case where noise is superimposed on a signal, as shown in FIG. 16, an adequate first sampling point SP1 can be set by performing adequate bit synchronization.

After setting the first sampling point SP1, sampling is performed at the sampling intervals SI, and either the first or second patterns PT1 and PT2 is determined based on the load state (signal level) at each sampling point.

For example, in FIG. 18, the load state at the sampling point SP2 is the second load state (low level), and therefore the load modulation pattern is determined to be the second pattern PT2, and the logic level is determined as being "0". Since the load state at the sampling point SP3 is the first load state (high level), the load modulation pattern is determined as being the first pattern PT1, and the logic level is determined as being "1". Since the load states at the sampling points SP4, SP5, and SP6 are the second load state (low level), the load modulation patterns are determined as being the second pattern PT2, and the logic levels are determined as being "0".

Note that, at each of the sampling points SP2 to SP6 in FIG. 18, the width of load state period that includes the sampling point may be verified to be in a predetermined range width.

For example, in the case where, at the second sampling point SP2, the load state is the first load state (high level), and the width of the first load state period TM1 that includes the second sampling point SP2 is within the first range width (220×T to 511×T), the load modulation pattern at the second sampling point SP2 is determined to be the first pattern PT1 (logic level "1").

On the other hand, in the case where, at the second sampling point SP2, the load state is the second load state (low level), and the width of the second load state period TM2 that includes the second sampling point SP2 is within the second range width (80×T to 150×T, for example), the load modulation pattern at the second sampling point SP2 is determined as being the second pattern PT2 (logic level "0").

Here, the second range width (80×T to 150×T) is a range width that is set corresponding to the second load state period TM2 (128×T) in the second pattern PT2. Since the typical value of period TM2 is 128×T corresponding to 1 bit, the second range width 80×T to 150×T is set so as to include the period 128×T.

In the present embodiment as described above, the logic level of the communication data is judged by determining the load modulation pattern. For example, in a known technique, a method is adopted in which the first load state in which the switching element SW in the load modulation portion 56 is turned on is judged to be the logic level "1", and the second load state in which the switching element SW is turned off is the logic level "0". However, in the method of the known technique, a communication data detection error due to noise or the like may occur, as described in FIG. 16.

In contrast, in the present embodiment, the logic level of each bit in the communication data is detected by determining whether the load modulation pattern is the first or second pattern PT1 or PT2, as shown in FIG. 17, for example. Accordingly, even in a situation in which there is a large amount of noise, as shown in FIG. 16, proper detection of the communication data is made possible. That is, the width of the first load state (high level) period TM1 is very different in the first and second patterns PT1 and PT2 in FIG. 17, and the logic level of each bit of the communication data is detected by identifying patterns as a result of identifying the difference of the period TM1 width in the present embodiment. For example, in the first bit synchronization in FIG. 18, in the case where the period TM1 width is within the first range width (220×T to 511×T), the sampling point SP1 is set at the center point of the period TM1, and signals are taken in at the sampling points SP2, SP3, SP4, thereafter. Therefore, even in a case where the period TM1 width or the like at the sampling point SP1 changes due to noise, for example, proper detection of the communication data is made possible. Also, since the sampling points SP2, SP3, SP4, . . . , thereafter can be set by simple processing based on the sampling interval SI, there is an advantage in that the processing load in the detection operation of the communication data can be reduced.

An example of the communication data format used in the present embodiment is shown in FIGS. 19A and 19B.

In FIG. 19A, the communication data is constituted by 64 bits, and one packet is configured by these 64 bits. The data of the first set of 16 bits is 0000h. In the case where normal power transmission (or intermittent power transmission) is started on the power transmitting side by detecting the load modulation on the power receiving side, for example, a certain amount of time is required before the current detection circuit 32 or the like in the communication portion 30 operates and the communication data can be properly detected. Therefore, 0000h that is dummy (null) data is set to the first 16 bits. Various processing necessary for bit synchronization, for example, is performed on the power transmitting side in a communication period of the first 16 bits 0000h.

A data code and information on the rectified voltage (VCC) are set in the second set of 16 bits. The data code is a code for specifying data that is to be transmitted by the third set of 16 bits, as shown in FIG. 19B. The rectified voltage (VCC) is used as transmitting power setting information of the power transmitting device 10.

Information such as temperature, a battery voltage, a battery current, a status flag, number of cycles, an IC number/charging execution/off start, or ID is set to the third set of 16 bits according to the setting designated by the data code. The temperature is a battery temperature or the like, for example. The battery voltage and the battery current are information representing the charge state of the battery 90. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle time) is information representing the number of charging times. The IC number is a number for specifying a control device IC. The charging execution flag (CGO) is a flag that indicates that the power transmitting side that has been authenticated is appropriate and charging is executed based on transmitting power from the power transmitting side. CRC information is set in the fourth set of 16 bits.

Note that the communication method of the present embodiment is not limited to the method described in FIGS. 17 to 19B and the like, and various modifications can be implemented. For example, although the first pattern PT1 is associated with the logic level "1" and the second pattern PT2 is associated with the logic level "0" in FIG. 17, the association relationship may be reversed. Also, the first and second patterns PT1 and PT2 in FIG. 17 are examples of the load modulation patterns, and the load modulation patterns of the present embodiment are not limited thereto and various modifications can be implemented. For example, although the first and second patterns PT1 and PT2 are set to have the same length in FIG. 17, they may be set to have different lengths. Also, in FIG. 17, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIG. 17 can be adopted. Also, the communication data format and the communication processing are not limited to the methods described in the present embodiment and various modifications can be implemented.

7. Control of Transmitting Power

In the present embodiment, a method is adopted in which power transmission control on the power transmitting side is performed based on communication data from the power receiving side. Specifically, the control portion 24 causes the power supply voltage control portion 14 to supply the power supply voltage VDRV that variably changes based on the transmitting power setting information included in the communication data, to the power transmission drivers DR1 and DR2 in the period of normal power transmission. Accordingly, the transmitting power of the power transmission portion 12 can be variably controlled based on the transmitting power setting information.

On the other hand, the control portion 24 causes the power supply voltage control portion 14 to supply the power supply voltage VDRV for landing detection and for removal detection to the power transmission drivers DR1 and DR2 in the period of intermittent power transmission for landing detection and for removal detection.

Here, the power supply voltage for landing detection and for removal detection is a voltage corresponding to the high potential side voltage level in the signal waveforms of the primary coil drive voltage in FIGS. 10 to 12. The power supply voltage for landing detection and the power supply voltage for removal detection may be the same voltage, or may be different voltages. For example, the power supply voltage for removal detection may be set to a higher voltage than the power supply voltage for landing detection. By setting the power supply voltage for removal detection to a high voltage, it is possible to suppress the occurrence of a situation in which removal of the electronic apparatus 510 is erroneously detected when the electronic apparatus 510 is not removed in actuality.

Alternatively, the control portion 24 may cause the power supply voltage control portion 14 to supply a variable voltage as the power supply voltage for landing detection or removal detection to the transmission drivers DR1 and DR2.

As a result of providing two power supply voltages such as 6 V and 9 V, for example, as the power supply voltages for landing detection, landing detection in a wide range is made possible. For example, in the case where the distance between the coils L1 and L2 is small, when a high power supply voltage (9 V, for example) is applied from the start, the voltage induced across the coil L2 may exceed the breakdown voltage in the power receiving side (secondary side), and a problem may occur. On the other hand, in the case of low power supply voltage (6 V, for example), there is a problem in that appropriate landing detection or the like cannot be realized in the case where the distance between the coils L1 and L2 is large or the like.

In this regard, if the power supply voltage for landing detection or removal detection is variably controlled, the aforementioned problem can be resolved. For example, in intermittent power transmission for landing detection or removal detection, the transmission drivers DR1 and DR2 are driven by a voltage of 6 V in the first half of the power transmission period (TL2 and TR2), and then transmission drivers DR1 and DR2 are driven by a voltage of 9 V (TL2=50 msec) in the second half of the power transmission period (TL2 and TR2). In this way, landing detection over a wider range is made possible. In this case, the power supply voltage or the like for landing detection or removal detection may be controlled so as to gradually increase from 6 V to 9 V, for example.

Figure 20A:
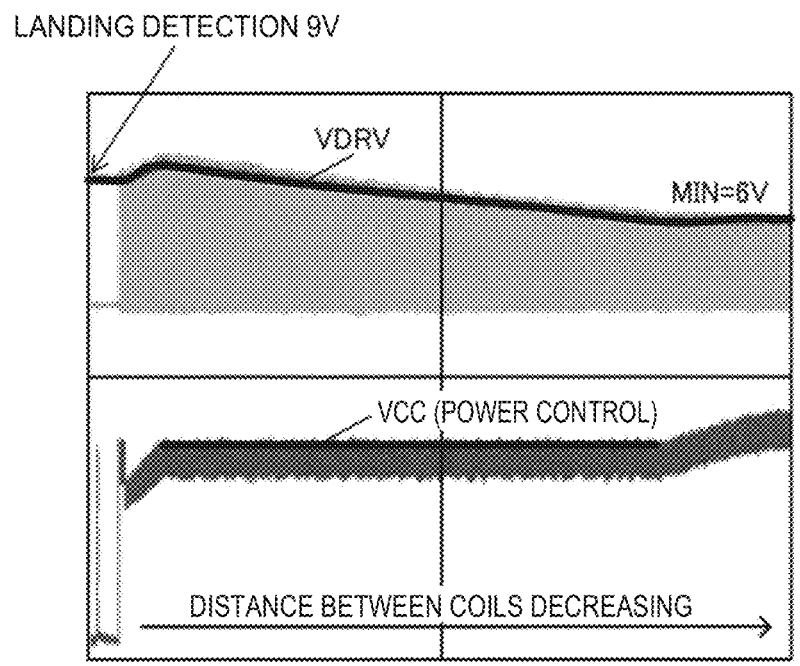
FIGS. 20A and 20B are diagrams for describing a power control method.
Figure 20B:
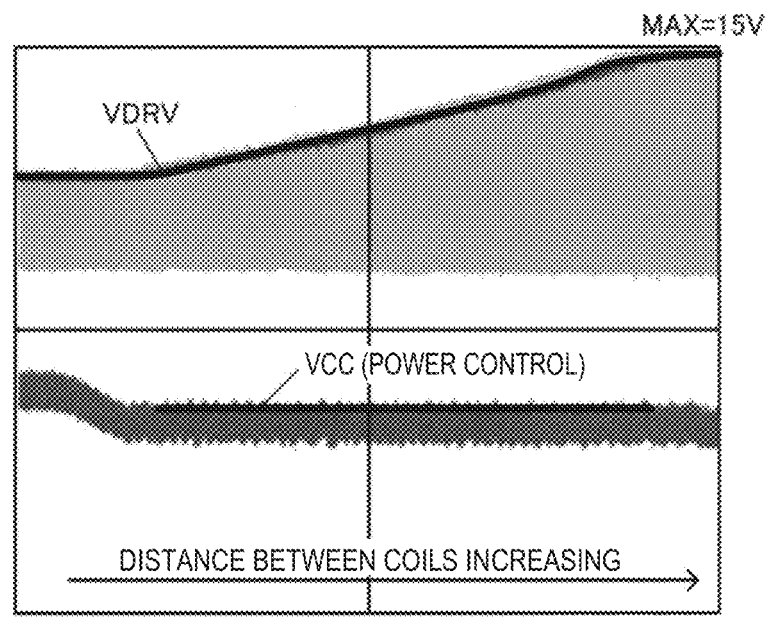

FIGS. 20A and 20B are diagrams for describing a method for controlling transmitting power based on the transmitting power setting information (such as rectified voltage VCC).

FIG. 20A shows an example in which the distance between the coils L1 and L2 is reduced. In this case, control is performed such that, after landing detection is performed at the power supply voltage VDRV of 9 V, the power supply voltage VDRV is lowered slowly as the distance between the coils decreases. That is, the power supply voltage control portion 14 performs control such that, under the control of the control portion 24, the power supply voltage VDRV that is supplied to the power transmission drivers DR1 and DR2 is lowered. That is, the power supply voltage VDRV is controlled such that the rectified voltage VCC, which is an output voltage of the power receiving portion 52, is to be constant. Accordingly, in the case where the distance between the coils L1 and L2 is reduced as well, power control is performed such that the received power of the power receiving device 40 is to be constant, and optimum and stable power control can be realized.

FIG. 20B shows an example in which the distance between the coils L1 and L2 is increased. In this case, control is performed such that the power supply voltage VDRV is increased slowly as the distance between the coils increases. That is, the power supply voltage control portion 14 performs control such that, under the control of the control portion 24, the power supply voltage VDRV that is supplied to the power transmission drivers DR1 and DR2 is increased. That is, the power supply voltage VDRV is controlled such that the rectified voltage VCC, which is an output voltage of the power receiving portion 52, is to be constant. Accordingly, in the case where the distance between the coils L1 and L2 is increased as well, power control is performed such that the received power of the power receiving device 40 is to be constant, and optimum and stable power control can be realized.

8. Power Receiving Portion and Charging Portion

Figure 21:
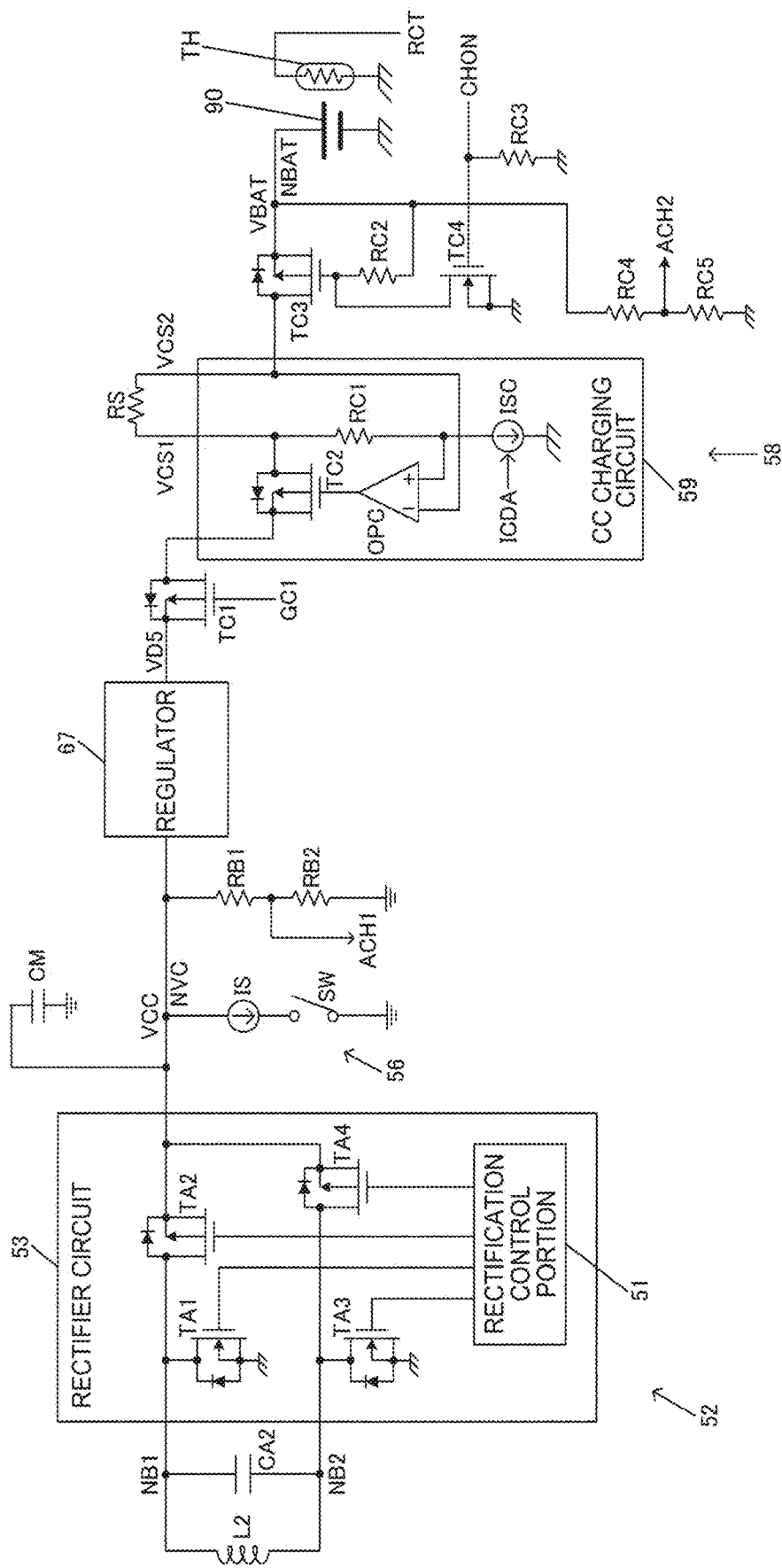
FIG. 21 is a detailed exemplary configuration of a power receiving portion and a charging portion.

A detailed exemplary configuration of the power receiving portion 52, the charging portion 58, and the like is shown in FIG. 21. The rectifier circuit 53 in the power receiving portion 52 includes transistors TA1, TA2, TA3, and TA4 for rectification and a rectification control portion 51 for controlling these transistors TA1 to TA4, as shown in FIG. 21. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65, for example. Accordingly, monitoring of the rectified voltage VCC is made possible, and thus power control based on the VCC and control of communication start and charging start based on the VCC can be realized.

The regulator 67 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the battery voltage VBAT exceeding a given voltage is detected, for example. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. Through virtual short of the operational amplifier OPC, the transistor TC2 is controlled such that the voltage (non-inverting input terminal voltage) on one end of the resistor RC1 is equal to the voltage VCS2 (inverting input terminal voltage) on another end of the sense resistor RS, which is an external component. The current that flows in the current source ISC by the control of the signal ICDA is represented as IDA, and the current that flows in the sense resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A transistor TC3 is provided between an output node of the CC charging circuit 59 and a supply node NBAT of the battery voltage VBAT. A drain of an N-type transistor TC4 is connected to a gate of the P-type transistor TC3, and a charging control signal CHON from the control portion 54 is input to a gate of the transistor TC4. Also, a pull-up resistor RC2 is provided between the gate of the transistor TC3 and the node NBAT, and a pull-down resistor RC3 is provided between the gate of the transistor TC4 and a GND (power supply on a low potential side) node. The power supply switch 42 in FIG. 2 is realized by the transistor TC3 (TC4).

When charging is performed, the control portion 54 sets the control signal CHON to an active level (high level). Accordingly, the N-type transistor TC4 is turned on, and the gate voltage of the P-type transistor TC3 becomes a low level. As a result, the transistor TC3 is turned on, and the charging of the battery 90 is performed.

On the other hand, when the control portion 54 sets the control signal CHON to an inactive level (low level), the N-type transistor TC4 is turned off. The gate voltage of the P-type transistor TC3 is pulled up to the battery voltage VBAT by the resistor RC2, and as a result, the transistor TC3 is turned off and the charging of the battery 90 is stopped.

Also, when the power supply voltage of the charging system becomes lower than the operation lower limit voltage of the circuit, the gate voltage of the transistor TC4 is pulled down to GND by the resistor RC3, and thus the transistor TC4 is turned off. Also, the gate voltage of the transistor TC3 is pulled up to the battery voltage VBAT by the resistor RC2, and thus the transistor TC3 is turned off. In this way, when the power receiving side is removed, and the power supply voltage becomes lower than the operation lower limit voltage, as a result of the transistor TC3 being turned off, the path between the output node of the CC charging circuit 59 and the node NBAT of the battery 90 is electrically cut off. Accordingly, reverse flow from the battery 90 when the power supply voltage becomes less than or equal to the operation lower limit voltage can be prevented.

Resistors RC4 and RC5 are provided in series between the node NBAT and the GND node, and a voltage ACH2 that is generated by voltage-dividing the battery voltage VBAT with the resistors RC4 and RC5 is input to the A/D converter circuit 65. Accordingly, monitoring of the battery voltage VBAT is made possible, and various types of control can be realized based on the charge state of the battery 90. Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of various embodiments of the invention. Accordingly, all those modifications are to be encompassed in the scope of various embodiments of the invention. For example, a term that is used at least once together with another term having a broader or the same meaning in the specification or the drawings may be replaced with the other term in any part of the specification or the drawings. All combinations of this embodiment and the modifications are also encompassed in the scope of the various embodiments of the invention. Configurations, operations, or the like of the power transmitting side control device, the power receiving side control device, the power transmitting device, the power receiving device are not limited to those described in this embodiment either, and various modifications can be implemented.

What is claimed is:

1. A power receiving device that receives power from a power transmitting device by contactless power transmission, the power receiving device comprising:
   a power receiving portion that receives power from the power transmitting device;
   a power supply portion that supplies power to a load based on power received by the power receiving portion;
   a load modulation portion that performs communication in which communication data is transmitted to the power transmitting device; and
   a control portion that controls the power supply portion and the load modulation portion, wherein the control portion:
      causes the load modulation portion to start communication when an output voltage of the power receiving portion becomes higher than a first voltage, and
      causes the power supply portion to start power supply to the load when the output voltage of the power receiving portion becomes higher than a second voltage that is different from the first voltage, after the communication via the load modulation is started and while the communication via the load modulation continues.

2. The power receiving device according to claim 1, wherein:
   the load modulation portion includes a constant current source and a switching element;
   the constant current source and the switching element are provided in series between a node of a rectified voltage and a low potential side power supply voltage node; and
   the switching element is turned on and off based on a control signal from the control portion.

3. The power receiving device according to claim 1, wherein:
   the power receiving portion receives intermittent power transmission for landing detection from the power transmitting device; and
   the control portion performs the detection based on the output voltage of the power receiving portion.

4. The power receiving device according to claim 3, wherein
   the control portion transmits dummy data in order for the power transmitting device to determine whether landing has been detected to the power transmitting device when the output voltage of the power receiving portion becomes higher than the first voltage.

5. The power receiving device according to claim 3, wherein
   the control portion allows the power supply portion to supply power to the load when the power transmitting device has succeeded in detecting landing and has made a reply to the power receiving device.

6. The power receiving device according to claim 1, wherein the load modulation portion starts load modulation when the output voltage of the power receiving portion becomes higher than the first voltage and landing is detected, and stops the load modulation when removal is detected.

7. The power receiving device according to claim 1, wherein
the load modulation portion performs load modulation such that a load modulation pattern for a first logic level of the communication data to be transmitted to the power transmitting device is a first pattern, and performs load modulation such that a load modulation pattern for a second logic level of the communication data to be transmitted to the power transmitting device is a second pattern that is different from the first pattern.

8. The power receiving device according to claim 1, wherein:
the load includes a battery and a power supply target of the battery; and
the power supply portion includes:
a charging portion that charges the battery based on power received by the power receiving portion, and
a discharging portion that performs an operation of discharging the battery and supplies the power from the battery to the power supply target.

9. The power receiving device according to claim 8, wherein
the control portion causes the discharging portion to stop the discharging operation when landing has been detected, and causes the discharging portion to perform the discharging operation in a removed period.

10. The power receiving device according to claim 1, wherein the first voltage is set to a voltage that is lower than the second voltage.

11. The power receiving device according to claim 1, further comprising:
a storage portion that stores voltage information of the first voltage, wherein
the control portion determines whether or not the output voltage of the power receiving portion is higher than the first voltage based on the voltage information stored in the storage portion.

12. A moving body comprising the power receiving device according to claim 1.

13. An electronic apparatus comprising the power receiving device according to claim 1.

14. The power receiving device according to claim 1, wherein the control portion causes the load modulation portion to:
transmit communication data to the power transmitting device when the output voltage of the power receiving portion becomes higher than the first voltage, and
not transmit the communication data to the power transmitting device when the output voltage of the power receiving portion is lower than the first voltage.

15. The power receiving device according to claim 14, wherein
the control portion controls the power supply portion, such that the power supply to the load is not started until after (i) the load modulation portion has transmitted the communication data to the power transmitting device and (ii) the output voltage of the power receiving portion has become higher than the second voltage.

16. The power receiving device according to claim 1, wherein
the communication via the load modulation is sending a digital message having a predetermined number of bits to the power transmitting device using a first load state to represent a logical 1 and a second load state to represent a logical 0.

* * * * *